(12) United States Patent
Komatsu

(10) Patent No.: US 10,530,952 B2
(45) Date of Patent: Jan. 7, 2020

(54) IMAGE DATA GENERATING METHOD, IMAGE DATA GENERATING APPARATUS, AND IMAGE FORMING SYSTEM

(71) Applicant: Manabu Komatsu, Tokyo (JP)

(72) Inventor: Manabu Komatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/153,936

(22) Filed: Oct. 8, 2018

(65) Prior Publication Data

US 2019/0199875 A1    Jun. 27, 2019

(30) Foreign Application Priority Data

Dec. 27, 2017    (JP) .................. 2017-251330

(51) Int. Cl.
*H04N 1/00* (2006.01)
*H04N 1/60* (2006.01)
*H04N 1/028* (2006.01)
*H04N 1/54* (2006.01)

(52) U.S. Cl.
CPC ..... *H04N 1/00726* (2013.01); *H04N 1/02825* (2013.01); *H04N 1/54* (2013.01); *H04N 1/6002* (2013.01); *H04N 1/6075* (2013.01); *H04N 2201/0094* (2013.01)

(58) Field of Classification Search
CPC ............... G07D 7/12; H01L 27/14825; H01L 27/14875; H04N 1/00846; H04N 1/00864; H04N 1/00875
USPC ........................................ 358/512, 514, 505
See application file for complete search history.

(56) References Cited

U.S. PATENT DOCUMENTS

| 5,831,751 | A | 11/1998 | Ohneda et al. |
| 6,005,970 | A | 12/1999 | Ohneda et al. |
| 6,016,359 | A | 1/2000 | Komatsu |
| 6,051,826 | A * | 4/2000 | Arimoto .................. G07D 7/12 250/208.1 |
| 7,003,176 | B1 | 2/2006 | Suzuki et al. |
| 2001/0019427 | A1 | 9/2001 | Komatsu |
| 2004/0004644 | A1 | 1/2004 | Komatsu et al. |
| 2005/0008258 | A1 | 1/2005 | Suzuki et al. |
| 2005/0237544 | A1 | 10/2005 | Suzuki et al. |
| 2007/0013927 | A1 | 1/2007 | Miyahara et al. |

(Continued)

FOREIGN PATENT DOCUMENTS

| JP | 2-266655 | 10/1990 |
| JP | 2011-129999 | 6/2011 |
| JP | 2013-070174 | 4/2013 |

OTHER PUBLICATIONS

U.S. Appl. No. 08/359,146, filed Dec. 19, 1994, Manabu Komatsu.

*Primary Examiner* — Negussie Worku
(74) *Attorney, Agent, or Firm* — Oblon, McClelland, Maier & Neustadt, L.L.P.

(57) ABSTRACT

An image data generating method of generating an image from a document includes acquiring, based on light reflected by the document, a first image signal corresponding to a plurality of components in a plurality of visible wavelength ranges and a component having a reflection absorption characteristic in an invisible wavelength range, converting the first image signal into a second image signal including a plurality of device-independent color space components and a black component, and generating image data based on the second image signal.

13 Claims, 12 Drawing Sheets

(56) References Cited

U.S. PATENT DOCUMENTS

| | | |
|---|---|---|
| 2007/0070438 A1 | 3/2007 | Yoshida et al. |
| 2007/0081719 A1* | 4/2007 | Moriya ............... G09G 3/2003 |
| | | 382/162 |
| 2007/0086068 A1 | 4/2007 | Ohkawa et al. |
| 2008/0037036 A1 | 2/2008 | Togami et al. |
| 2008/0186533 A1 | 8/2008 | Komatsu |
| 2008/0309994 A1 | 12/2008 | Komatsu |
| 2012/0218172 A1* | 8/2012 | Border ............... G02B 27/0093 |
| | | 345/8 |
| 2012/0249929 A1* | 10/2012 | Fukuda ............... G02F 1/13718 |
| | | 349/74 |
| 2015/0051498 A1* | 2/2015 | Darty .................... A61B 5/447 |
| | | 600/477 |
| 2015/0172514 A1 | 6/2015 | Komatsu |
| 2016/0156882 A1* | 6/2016 | Nam ..................... H04N 9/045 |
| | | 348/280 |
| 2017/0026632 A1* | 1/2017 | Ishiga .................. H04N 13/207 |
| 2017/0272709 A1* | 9/2017 | Hagiwara ............. G02B 5/201 |
| 2018/0013924 A1 | 1/2018 | Komatsu |

\* cited by examiner

IMAGE DATA GENERATING METHOD, IMAGE DATA GENERATING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2017-251330 filed on Dec. 27, 2017, in the Japan Patent Office, the entire disclosure of which is hereby incorporated by reference herein.

BACKGROUND

Technical Field

The present invention relates to an image data generating method, an image data generating apparatus, and an image forming system.

Description of the Related Art

Image data read from a document by a device such as a scanner or an inline sensor is normally RGB image data in red (R), green (G), and blue (B) colors. The RGB image data generated through reading of a document by a device such as a scanner will hereinafter be referred to as the read RGB image data. It is desirable for an image forming system that forms an image with the read RGB image data is to reproduce and output a color substantially the same as the color of a source document and obtain a color determination result accurately determining the color of the source document irrespective of the type of document.

Therefore, there are a technique of accurately color-converting the read RGB image data read by a device such as a scanner and a technique of automatically determining the color of the source document.

For example, there is a technique of outputting grayscale patches at different black ratios and updating color correction parameters for correcting the reading of a sensor based on the difference between the read RGB image data and read monochrome image data. With this technique, color correction is performed for color documents with different spectral reflectances based on the difference between the read RGB image data and the read monochrome image data, thereby improving the accuracy of the color correction.

Unlike a spectral colorimeter, however, the scanner or inline sensor that acquires the read RGB image data is unable to perform image reading in multiple bands. For the image forming system employing the scanner or inline sensor, therefore, it is difficult to detect a characteristic difference between composite gray formed with CMY color materials corresponding to three colors: cyan (C), magenta (M), and yellow (Y) and component gray formed on a black (K) plane.

SUMMARY

In one embodiment of this invention, there is provided an improved image data generating method of generating an image from a document. The image data generating method includes, for example, acquiring, based on light reflected by the document, a first image signal corresponding to a plurality of components in a plurality of visible wavelength ranges and a component having a reflection absorption characteristic in an invisible wavelength range, converting the first image signal into a second image signal including a plurality of device-independent color space components and a black component, and generating image data based on the second image signal.

In one embodiment of this invention, there is provided an improved image data generating apparatus that includes, for example, circuitry to acquire, based on light reflected by a document, a first image signal corresponding to a plurality of components in a plurality of visible wavelength ranges and a component having a reflection absorption characteristic in an invisible wavelength range, convert the first image signal into a second image signal including a plurality of device-independent color space components and a black component, and generate image data based on the second image signal.

In one embodiment of this invention, there is provided an improved image forming system that includes, for example, a reading unit, an image forming unit, and circuitry. The reading unit receives light beams in a plurality of visible wavelength ranges and a light beam in an invisible wavelength range. Each of the light beams is reflected by a document. The reading unit further outputs a first image signal including a plurality of signals generated through photoelectric conversion on the received light beams in the plurality of visible wavelength ranges and a signal generated through photoelectric conversion on the received light beam in the invisible wavelength range. The image forming unit forms an image with a combination of a plurality of colors. The circuitry acquires the first image signal, converts the first image signal into a second image signal including a plurality of device-independent color space components and a black component, converts the plurality of device-independent color space components included in the second image signal into a plurality of color components to be included in image data for the image forming unit, and generates the image data for the image forming unit based on the plurality of color components to be included in the image data and the black component included in the second image signal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
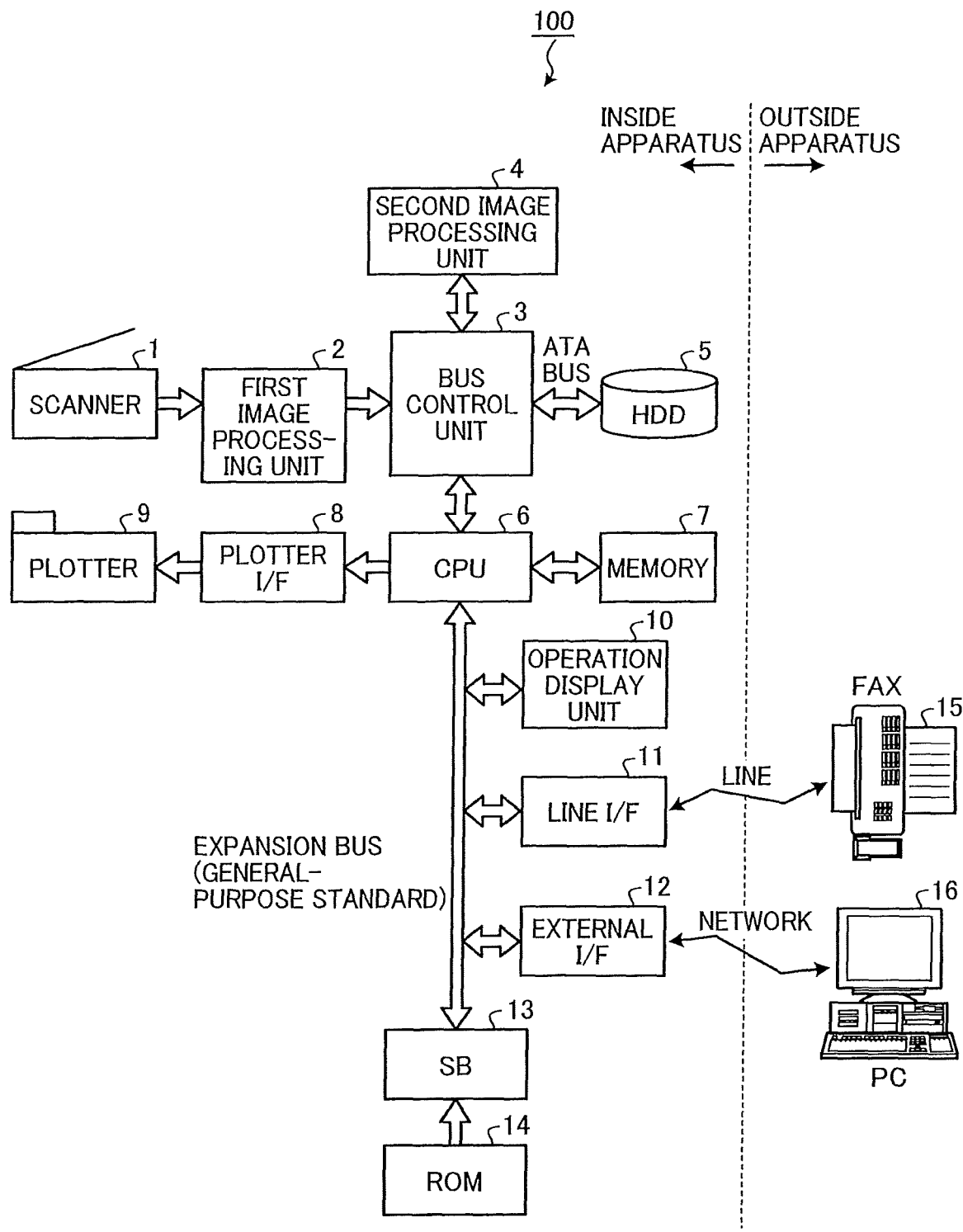
FIG. 1 is a block diagram illustrating an exemplary configuration of an image forming apparatus as an image data generating apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An image data generating method, an image data generating apparatus, and an image forming system according to an embodiment of the present invention will be described in detail below with reference to the accompanying drawings.

FIG. 1 illustrates an exemplary configuration of an image forming apparatus as an image data generating apparatus according to the embodiment. In FIG. 1, an image forming apparatus 100 is configured as a multi-function printer (MFP) including a scanner 1 and a plotter 9 to realize, in a single housing, a reading function of the scanner 1 to read the image of a document, an image forming function of the plotter 9, and a copy function of forming an image based on the image of the document read by the scanner 1.

In the image forming apparatus 100 according to the embodiment, the scanner 1 is capable of outputting, as image data read from a document, regular RGB image data of three colors: red (R), green (G), and blue (B) and IR image data based on a near-infrared (IR) component. The IR component is a component having a reflection absorption characteristic in an invisible wavelength range. The image forming apparatus 100 converts RGB components of the RGB image data and the IR image data output from the scanner 1 into device-independent color space components. The image forming apparatus 100 performs color calibration of the scanner 1 based on the device-independent color space components, thereby improving the accuracy of the color calibration.

The image data generating apparatus of the embodiment described here is an MFP. The image data generating apparatus of the embodiment, however, is not limited thereto. The image data generating apparatus of the embodiment may include at least the scanner 1 capable of outputting the read image data including R, G, B, and IR components and a signal processing unit that generates the device-independent color space components based on the R, G, B, and IR components read by the scanner 1.

The image forming apparatus 100 in FIG. 1 will be described in more detail.

In FIG. 1, the image forming apparatus 100 includes the scanner 1, a first image processing unit 2, a bus control unit 3, a second image processing unit 4, a hard disk drive (HDD) 5, a central processing unit (CPU) 6, a memory 7, a plotter interface (I/F) 8, the plotter 9, an operation display unit 10, a line I/F 11, an external I/F 12, a south bridge (SB) 13, and a read only memory (ROM) 14.

Figure 2:
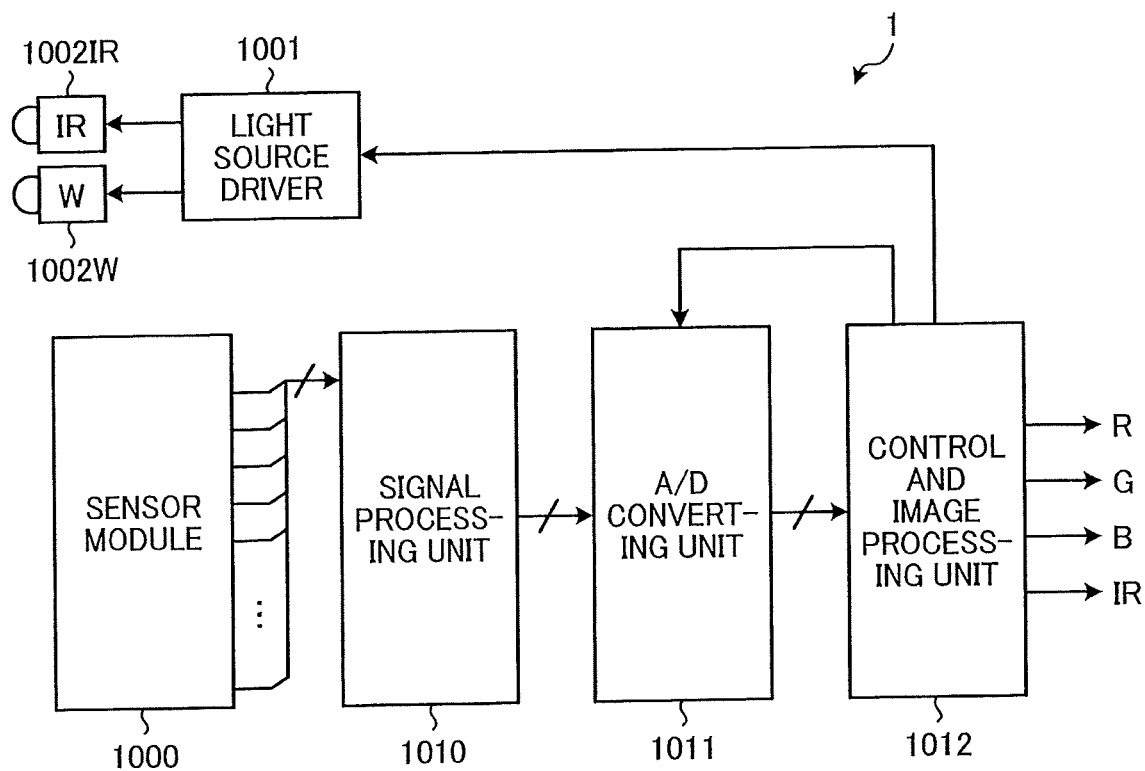
FIG. 2 is a block diagram illustrating an exemplary configuration of a scanner applicable to the embodiment.

FIG. 2 illustrates an exemplary configuration of the scanner 1 applicable to the embodiment. In FIG. 2, the scanner 1 includes a sensor module 1000, a light source driver 1001, a light source 1002W, a light source 1002IR, a signal processing unit 1010, an analog-to-digital (A/D) converting unit 1011, and a control and image processing unit 1012. The scanner 1 scans a document set thereon to generate 8-bit image data items of components of plural wavelengths from contrast information of the document obtained through the scanning, and outputs the generated 8-bit image data items.

The light source 1002W is a white light source that emits white light. For example, the light source 1002W is a combination of a light emitting diode (LED) that emits blue light and a luminous body that is excited by blue light to emit yellow fluorescence. The light source 1002W emits pseudo-white light based on blue and yellow fluorescence. In this case, the light source 1002W has a spectral characteristic of having a strong sharp peak of intensity near a wavelength of 465 nm, a weak gentle peak of intensity near a wavelength of 560 nm, and an intensity of substantially zero at a wavelength longer than 800 nm. The light source 1002IR emits near-infrared light with a peak of intensity near a wavelength of 800 nm, for example. The light source 1002IR may be formed with an LED. The light source driver 1001 is controlled by the control and image processing unit 1012 to drive the light sources 1002W and 1002IR.

The sensor module 1000 includes a line sensor in which photoelectric conversion elements such as charge coupled devices (CCDs) are coupled into an array in the main scanning direction. The photoelectric conversion elements of the sensor module 1000 output analog detection signals to the signal processing unit 1010. The signal processing unit 1010 performs predetermined signal processing, such as gain adjustment and noise removal, on the detection signals supplied thereto, and outputs the processed detection signals to the A/D converting unit 1011.

The A/D converting unit 1011 is controlled by the control and image processing unit 1012 to sample the detection signals from the signal processing unit 1010 at intervals of every line, for example, digitize the sampled detection signals, and supply the digitized detection signals to the control and image processing unit 1012. The control and image processing unit 1012 converts each of the R, G, B, and IR components of each of the supplied detection signals into 8-bit image data (i.e., RGB image data and IR image data), and outputs the 8-bit image data. The RGB image data and the IR image data output from the control and image processing unit 1012 will be hereinafter collectively referred to as the first image signal.

Figure 3:
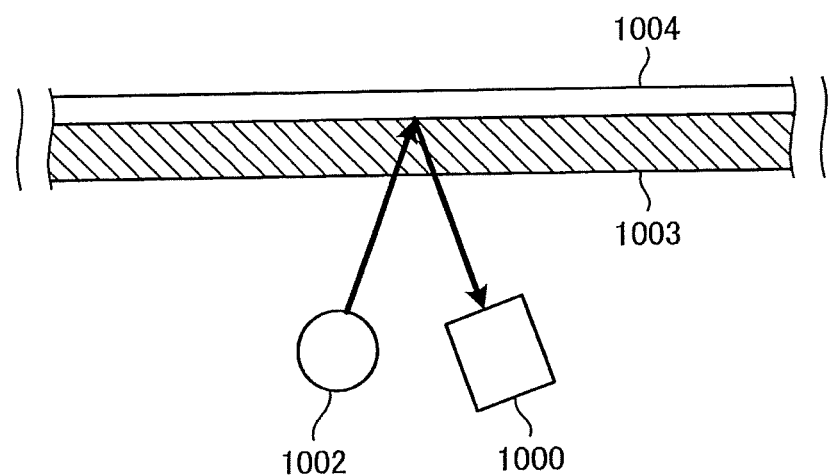
FIG. 3 is a diagram illustrating exemplary arrangement of a sensor module and a light source in the scanner applicable to the embodiment.

FIG. 3 illustrates exemplary arrangement of the sensor module 1000 and the light sources 1002W and 1002IR in the scanner 1 applicable to the embodiment. In FIG. 3, the light sources 1002W and 1002IR are collectively illustrated as a light source 1002. In this example, the scanner 1 is illustrated as employing a contact sensor system. That is, the light source 1002 and the sensor module 1000 are disposed close to one surface of a contact glass 1003, and a document 1004 is placed on the other surface of the contact glass 1003. White light and near-infrared light emitted from the light source 1002 are reflected by the document 1004 via the contact glass 1003 and received by the sensor module 1000 via the contact glass 1003.

Figure 4A:
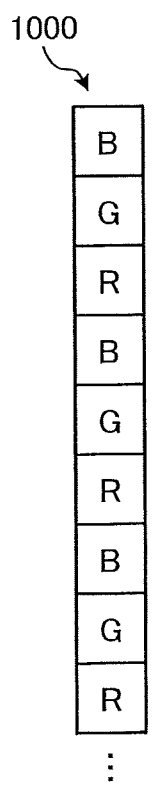
FIGS. 4A to 4C are diagrams illustrating exemplary configurations of the sensor module applicable to the embodiment.
Figure 4B:
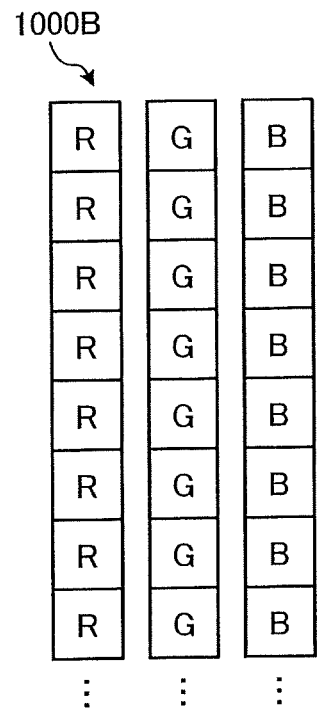
Figure 4C:
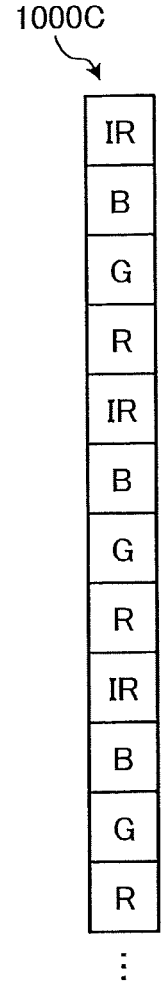

FIGS. 4A to 4C illustrate exemplary configurations of the sensor module 1000 applicable to the embodiment. FIG. 4A illustrates the sensor module 1000 as an exemplary sensor module including R, G, and B color filters disposed on the photoelectric conversion elements aligned in the main scanning direction in the sensor module 1000. FIG. 4B illustrates a sensor module 1000B as an exemplary sensor module including three line sensors equipped with R color filters, G color filters, and B color filters, respectively (hereinafter simply referred to as the R, G, and B filters). A sensor module 1000C in FIG. 4C will be described later.

Figure 5:
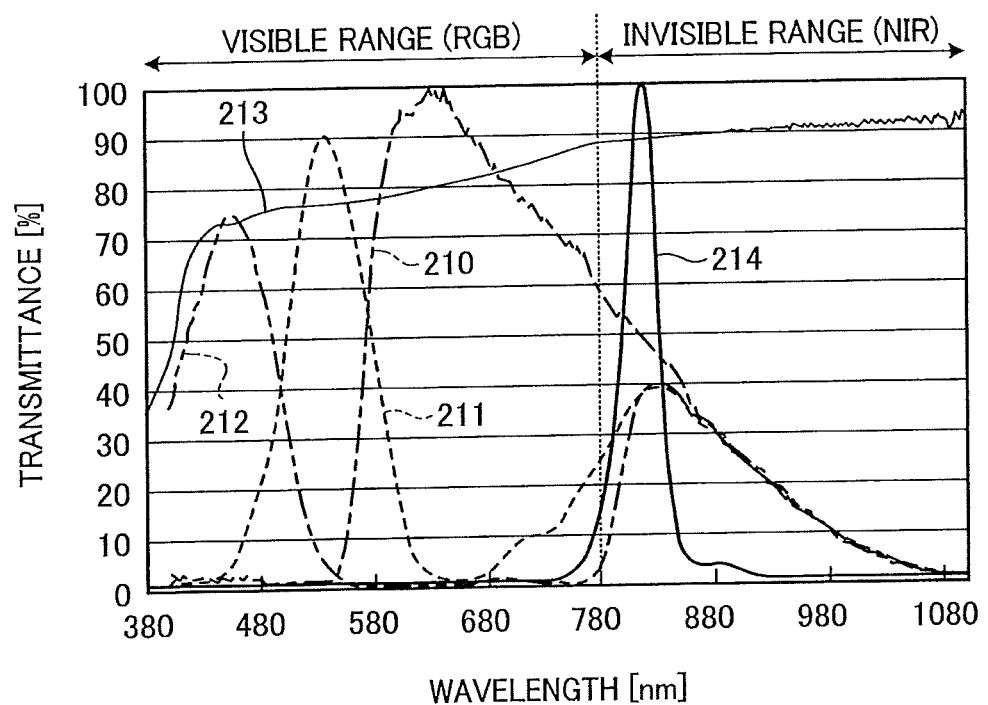
FIG. 5 is a graph illustrating exemplary characteristics of red, green, and blue (RGB) color filters applicable to the embodiment.

FIG. 5 illustrates exemplary characteristics of the R, G, and B filters applicable to the embodiment. In FIG. 5, the horizontal axis represents the wavelength, and the vertical axis represents the transmittance as a filter characteristic or the reflectance of a document that is read (hereinafter referred to as the read document). It is assumed here that a wavelength range higher than 780 nm and equal to or lower than 1080 nm is an invisible range (i.e., near-infrared (NIR) range) in which light is not perceivable by human eye, and that a wavelength range higher than 380 nm and equal to or lower than 780 nm is a visible range in which light is perceivable by human eye.

In FIG. 5, characteristic lines 210, 211, and 212 represent exemplary spectral transmittances of the R, G, and B filters, respectively. Further, a characteristic line 213 represents an exemplary spectral reflectance of the read document. The integral of the overlapping area of the area of the characteristic line 210 and the area of the characteristic line 213 representing the spectral reflectance of the read document corresponds to the reading of the R component. Similarly, the integral of the overlapping area of the area of the characteristic line 211 and the area of the characteristic line 213 corresponds to the reading of the G component, and the integral of the overlapping area of the area of the characteristic line 212 and the area of the characteristic line 213 corresponds to the reading of the B component.

More specifically, the transmittance of the R filter gradually declines from a peak thereof near 630 nm toward 1080 nm in the invisible range, as indicated by the characteristic line 210. The transmittance of the G filter has a peak near 530 nm and another peak near 830 nm in the invisible range, as indicated by the characteristic line 211. The transmittance of the B filter has a peak near 430 nm and another peak near 830 nm in the invisible range, as indicated by the characteristic line 212. Further, the read document has a reflectance of at least 70% in a range from approximately 430 nm to approximately 1080 nm, as indicated by the characteristic line 213.

In FIG. 5, as indicated by a characteristic line 214 representing a spectral characteristic of the light source 1002IR that emits light in an IR range, there is a strong peak in a range from 800 nm to 830 nm. In this case, the sensor module 1000 is capable of detecting the light from the light source 1002IR owing to the above-described characteristics of the R, G, and B filters in the invisible range.

For example, the control and image processing unit 1012 controls the light source driver 1001 to sequentially turn on the light source 1002W and the light source 1002IR in one line. In synchronization with the control of the light source driver 1001, the control and image processing unit 1012 controls the time of sampling in the A/D converting unit 1011, and determines the detection signals sampled during the ON time of the light source 1002W as the detection signals of the R, G, and B components and the detection signals sampled during the ON time of the light source 1002IR as the detection signals of the IR component.

The configuration of the scanner 1 described above with reference to FIGS. 2 to 4B is illustrative, and the scanner 1 is not limited to the above configuration example. For example, the scanner 1 does not necessarily employ the contact sensor system, and may employ an optical reduction system. Further, in the above-described example, the light source 1002W and the light source 1002IR are sequentially turn on in one line, and the detection signals output from the sensor module 1000 are sampled in synchronization with the turn-on of the light source 1002W and the turn-on of the light source 1002IR. However, the configuration is not limited to this example. For instance, a light source that emits light at the wavelength of the R component, a light source that emits light at the wavelength of the G component, a light source that emits light at the wavelength of the B component, and a light source that emits light at the wavelength of the IR component may be provided and sequentially turned on for each line to obviate the need for color filters in the sensor module 1000.

Further, in the example using the light sources 1002W and 1002IR, the photoelectric conversion elements aligned in the main scanning direction may be equipped with IR color filters that selectively transmit therethrough light in the IR wavelength range, in addition to the R, G, and B color filters, as in the sensor module 1000C illustrated in FIG. 4C. This configuration added with the IR color filters is also applicable to the configuration illustrated in FIG. 4B.

Referring back to FIG. 1, the first image processing unit 2 processes the RGB image data and the IR image data output from the control and image processing unit 1012 of the scanner 1 to standardize the RGB image data and the IR image data to a predetermined characteristic, and outputs the processed RGB image data and IR image data.

Figure 6:
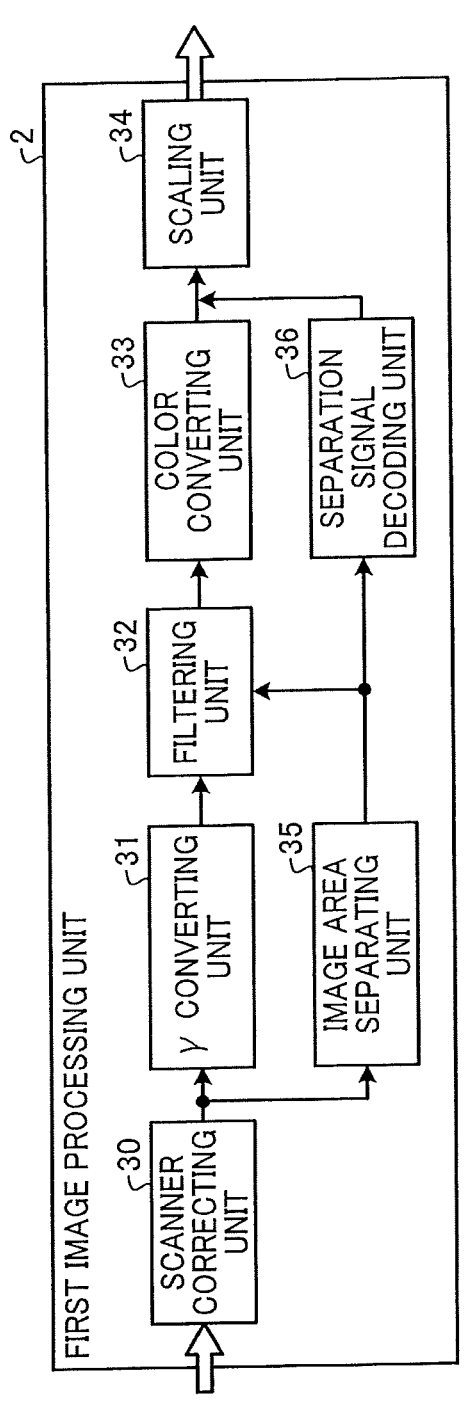
FIG. 6 is a block diagram illustrating an exemplary configuration of a first image processing unit applicable to the embodiment.

FIG. 6 illustrates an exemplary configuration of the first image processing unit 2 applicable to the embodiment. As illustrated in FIG. 6, the first image processing unit 2 includes a scanner correcting unit 30, a γ converting unit 31, a filtering unit 32, a color converting unit 33, a scaling unit 34, an image area separating unit 35, and a separation signal decoding unit 36.

The scanner correcting unit 30, the γ converting unit 31, the filtering unit 32, the color converting unit 33, the scaling unit 34, the image area separating unit 35, and the separation signal decoding unit 36 are configured as one or more hardware modules cooperating with each other. However, the scanner correcting unit 30, the γ converting unit 31, the filtering unit 32, the color converting unit 33, the scaling unit 34, the image area separating unit 35, and the separation signal decoding unit 36 are not limited to this configuration, and may be configured as a predetermined program running on the CPU 6.

The scanner correcting unit 30 performs a correction process, such as shading, on the image data output from the scanner 1 to correct, for example, uneven image reading due to the structure of the scanner 1 (e.g., illuminance deviation). Further, the scanner correcting unit 30 includes a calibration table storing information used to adjust characteristics of the scanner 1. The calibration table stores, for example, data for adjusting gains of the R, G, B, and IR image data output from the scanner 1.

The γ converting unit 31 converts, for example, the RGB image data included in the RGB image data and IR image data received from the scanner 1 such that the RGB image data has a predetermined γ characteristic (e.g., (1/2.2)-th power). The filtering unit 32 processes the RGB image data to correct a modulation transfer function (MTF) characteristic of the scanner 1. Further, to prevent moire, the filtering unit 32 clarifies or smooths the image by changing a frequency characteristic of the read image.

The color converting unit 33 converts the values of the R, G, B, and IR image data items output from the filtering unit 32 into device-independent color space components and a black component. For example, tristimulus values (e.g., XYZ chromaticity values), an L*a*b* color system (e.g., CIE L*a*b*), or an L*u*v* color system (e.g., CIE LUV) may be applied to express the device-independent color space components. Herein, CIE refers to International Commission on Illumination. It is assumed in the following description that the XYZ chromaticity values are used to express the device-independent color space components, unless otherwise specified. The color converting unit 33 outputs image data including the device-independent color space components and the black component.

The black component output here is predicted from the RGB image data and the IR image data, and will be hereinafter referred to as the predicted black component. Further, the device-independent color space components output from the color converting unit 33 will be referred to as the standardized RGB image data, unless otherwise specified. Further, the image data including the device-independent color space components and the predicted black component and output from the color converting unit 33 will be referred to as the second image signal.

The scaling unit 34 standardizes the size (i.e., resolution) of each of the image data items output from the color converting unit 33, i.e., the standardized RGB image data and the predicted black component, to a predetermined characteristic. For example, the scaling unit 34 converts the size (i.e., resolution) of each of the image data items into 600 dots per inch (dpi). The image data items output from the scaling unit 34 are stored in the HDD 5 via the bus control unit 3. In this process, the image data items output from the scaling unit 34 may be stored in the HDD 5 after being compression-coded by the CPU 6 in accordance with a predetermined coding method.

In the first image processing unit 2, the image area separating unit 35 extracts characteristic areas of the document. For example, the image area separating unit 35 performs extraction of halftone areas formed by normal printing, extraction of edge parts such as parts of letters, determination of whether the image data is chromatic or achromatic, and white background determination of whether a background image is white. The separation signal decoding unit 36 decodes an image area separation signal output from the image area separating unit 35 into an amount of information to be used in the later-described processing of the second image processing unit 4, and outputs the decoded image area separation signal as supplementary information of the image data. The image area separation signal includes information such as whether the image data corresponds to an area inside a letter, whether the image data corresponds to a letter, whether the image data corresponds to a dense halftone area, whether the image data corresponds to a chromatic area, whether the image data corresponds to a white background area, and whether the image data corresponds to a sparse halftone area, for example.

The bus control unit 3 is a control unit that controls a data bus for exchanging a variety of data such as image data and control commands used in the image forming apparatus 100. The bus control unit 3 also functions as a bridge between plural types of bus standards. In the present embodiment, the bus control unit 3 is coupled to the first image processing unit 2, the second image processing unit 4, and the CPU 6 via a peripheral component interconnect express (PCI-Express) bus, and is coupled to the HDD 5 via an advanced technology attachment (ATA) bus, thereby forming an application specific integrated circuit (ASIC).

The second image processing unit 4 executes image processing on the image data and the supplementary information output from the first image processing unit 2 and stored in the HDD 5 to generate image data and supplementary information suitable for an output designation specified by a user. For example, the second image processing unit 4 generates image data different in color combination from the RGB image data generated by the scanner 1 and output from the first image processing unit 2. For example, the second image processing unit 4 generates cyan (C), magenta (M), yellow (Y), and black (K) image data based on the image data output from the first image processing unit 2.

Figure 7:
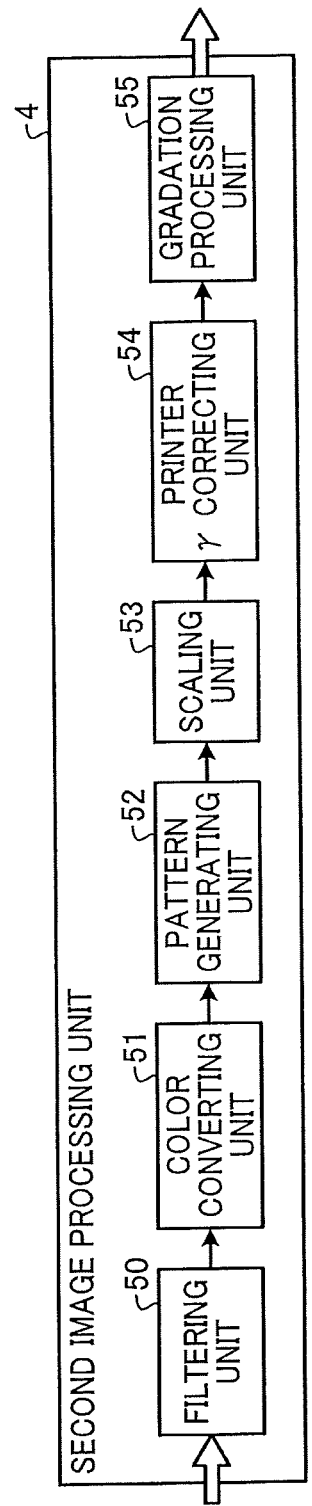
FIG. 7 is a block diagram illustrating an exemplary configuration of a second image processing unit applicable to the embodiment.

FIG. 7 illustrates an exemplary configuration of the second image processing unit 4 applicable to the embodiment. As illustrated in FIG. 7, the second image processing unit 4 includes a filtering unit 50, a color converting unit 51, a pattern generating unit 52, a scaling unit 53, a printer γ correcting unit 54, and a gradation processing unit 55.

The filtering unit 50, the color converting unit 51, the pattern generating unit 52, the scaling unit 53, the printer γ correcting unit 54, and the gradation processing unit 55 are configured as one or more hardware modules cooperating with each other. However, the filtering unit 50, the color converting unit 51, the pattern generating unit 52, the scaling unit 53, the printer γ correcting unit 54, and the gradation processing unit 55 are not limited to this configuration, and may be configured as a predetermined program running on the CPU 6.

The filtering unit 50 corrects the sharpness of the standardized RGB image data and the image data of the predicted black component to improve the reproducibility of the image data to be output to the plotter 9. Specifically, the filtering unit 50 executes a sharpening process or a smoothing process on the image data based on attribute information (i.e., the image area separation signal) decoded in accordance with a set image quality mode. For example, in text document mode, the filtering unit 50 executes the sharpening process to clarify letters. Further, in photograph mode, the filtering unit 50 executes the smoothing process to express smooth gradation.

The color converting unit 51 receives and converts the 8-bit standardized RGB image data and the 8-bit image data of the predicted black component into 8-bit image data corresponding to the C, M, Y, and K colors in the color space for the plotter 9 (hereinafter collectively referred to as the CMYK image data). The color converting unit 51 converts the standardized RGB image data into CMY image data including C, M, and Y components, as described in more detail later. The color converting unit 51 performs a black process on the CMY image data based on the predicted black component to generate C, M, Y, and K color components as the components of the color space for the plotter 9, and outputs image data of the generated C, M, Y, and K color components as the CMYK image data.

Further, the color converting unit 51 is capable of executing desirable color adjustment on the CMYK image data in accordance with the attribute information (i.e., the image area separation signal) decoded based on the information of the set image quality mode.

The scaling unit 53 converts the size (i.e., resolution) of the CMYK image data in accordance with the reproducibility of the plotter 9. The scaling unit 53 may not perform this conversion depending on the performance (i.e., resolution) of the plotter 9. The printer γ correcting unit 54 executes γ correction on the CMYK image data by executing table conversion for each of C, M, Y, and K plates with edge γ tables and non-edge γ tables for the C, M, Y, and K colors. The CPU 6 previously generates and sets the edge γ tables and the non-edge γ tables to generate the image data to be output to the plotter 9.

The gradation processing unit 55 receives the CMYK image data output from the printer γ correcting unit 54, and performs a gradation number conversion process on the CMYK image data in accordance with the gradation processing capacity of the plotter 9. For example, the gradation processing unit 55 performs the gradation number conversion process with an error diffusion method, which is a method of pseudo-halftoning, to convert each of the C, M, Y, and K image data items of the CMYK image data into 2-bit image data.

The pattern generating unit 52 generates patch patterns based on grayscale used in color calibration of the scanner 1. In the embodiment, the pattern generating unit 52 generates patch patterns of composite gray formed with the C, M, and Y components and patch patterns of component gray formed with a single color component, i.e., the black (K) component, as described in more detail later. The pattern generating unit 52 operates during the generation of the patch patterns. When the generation of the patch patterns is not taking place, the pattern generating unit 52 outputs input signals without generating the patch patterns.

The CPU 6 is a microprocessor that executes overall control of the image forming apparatus 100. In the image forming apparatus 100 of the embodiment, the CPU 6 may be an integrated CPU in which a CPU core is added with some functions, for example. The ROM 14 stores programs for the CPU 6 to control the image forming apparatus 100, such as a boot program.

The SB 13 is a general-purpose electronic device used as one of chipsets used in a personal computer (PC). The SB 13 is a general-purpose circuit with a bus bridging function used to build a CPU system mainly including a PCI-Express bridge and an industry standard architecture (ISA) bridge. In the example of FIG. 1, the SB 13 functions as a bridge to the ROM 14.

The memory 7 is a volatile memory that stores data temporarily exchanged to reduce the difference in speed in bridging between a plurality of bus standards and the difference in processing speed between coupled components. Further, when the CPU 6 controls the image forming apparatus 100, the memory 7 temporarily stores programs and intermediate processing data. The CPU 6 performs high-speed processing. In normal booting of the system of the image forming apparatus 100, therefore, the CPU 6 uses the boot program stored in the ROM 14 to boot the system. After the booting, the CPU 6 performs processing in accordance with programs deployed in the memory 7, which is accessible at high speed. For example, a dual inline memory module (DIMM) standardized and used in PCs may be employed as the memory 7.

The plotter I/F 8 performs a bus bridging process of receiving the CMYK image data transmitted via a general-purpose standard I/F integrated in the CPU 6 and outputting the CMYK image data to a dedicated I/F of the plotter 9. The general-purpose standard I/F is a PCI-Express bus, for example.

The plotter 9 receives the CMYK image data, and performs image formation on a print medium based on the received CMYK image data. The plotter 9 may perform the image formation on the print medium with an electrophotographic process that uses laser beams and toners to form an image, or with an inkjet system that forms an image with inks ejected from nozzles. It is assumed in the following description that the plotter 9 forms an image with the C, M, Y, and K toners with the electrophotographic process.

The operation display unit 10 forms a user interface (UI) of the image forming apparatus 100. For example, the operation display unit 10 includes a liquid crystal display (LCD) as a display device and key switches as an input device that receives inputs from the user. The operation display unit 10 displays, on the LCD, various states of the image forming apparatus 100 and methods of operating the image forming apparatus 100, and detects input to a key switch by the user. The operation display unit 10 is coupled to the CPU 6 via the PCI-Express bus, for example.

The line I/F 11 couples the PCI-Express bus to a telephone line to allow the image forming apparatus 100 to transmit and receive a variety of data via the telephone line. A facsimile (FAX) 15 is a normal facsimile machine that exchanges image data with the image forming apparatus 100 via the telephone line.

The external I/F 12 is an interface for coupling the PCI-Express bus to a network such as a local area network (LAN). The external I/F 12 couples the PCI-Express bus to an external apparatus such as a PC 16, for example, via the network to allow the image forming apparatus 100 to exchange a variety of data with the external apparatus.

As an example of the operation of the image forming apparatus 100 applicable to the embodiment, a copying operation of the image forming apparatus 100 will be described.

The user places a document on the scanner 1, and inputs information to the operation display unit 10 to set a desired image quality mode and start the copying operation. The operation display unit 10 converts the information input by the user into control command data in the image forming apparatus 100, and outputs the control command data to the CPU 6 via the PCI-Express bus.

In accordance with the control command data for starting the copying operation, the CPU 6 executes a program of the processes of the copying operation, and sequentially performs settings and processes of the copying operation. The processes of the copying operation will be sequentially described below.

The scanner 1 scans the document, and outputs RGB image data and IR image data obtained through the scanning. The first image processing unit 2 generates 8-bit standardized RGB image data and 8-bit predicted black component image data with the scanner correcting unit 30, the γ converting unit 31, the filtering unit 32, and the color converting unit 33 in FIG. 6, irrespective of the set image quality mode. The first image processing unit 2 transmits the thus-generated image data to the bus control unit 3.

Further, the separation signal decoding unit 36 of the first image processing unit 2 decodes the image area separation signal generated by the image area separating unit 35 into information for the processing of the second image processing unit 4 in accordance with the set image quality mode, and outputs the decoded image area separation signal.

The bus control unit 3 receives the image data and information output from the first image processing unit 2, i.e., the standardized RGB image data, the black component image data, and the attribute information (i.e., the image area separation signal) of the attribute that changes depending on the set image quality mode. The bus control unit 3 then encodes, as necessary, the received standardized RGB image data and attribute information via the CPU 6, and stores the standardized RGB image data and attribute information into the memory 7 and the HDD 5.

The CPU 6 decodes, as necessary, the standardized RGB image data, the black component image data, and the attribute information of pixels stored in the memory 7 and the HDD 5, and transmits the standardized RGB image data, black component image data, and attribute information to the second image processing unit 4 via the bus control unit 3. The second image processing unit 4 converts the received standardized RGB image data and black component image data into CMYK image data for the plotter 9, and outputs the CMYK image data. Before outputting the CMYK image data, the second image processing unit 4 may process the CMYK image data based on the attribute information for the pixels.

The bus control unit 3 receives the CMYK image data output from the second image processing unit 4, and stores the CMYK image data into the memory 7 via the CPU 6. The CMYK image data stored in the memory 7 is transmitted to the plotter 9 via the CPU 6 and the plotter I/F 8. The plotter 9 performs image formation on a print medium based on the received CMYK image data, to thereby produce a copy of the document.

The color calibration according to the embodiment will be described in detail. To promote understanding of the color calibration of the embodiment, an existing color calibration method will be described prior to the description of the color calibration of the embodiment.

A scanner that reads the image of a document and outputs image data normally outputs the RGB image data of the R, G, and B colors as the read image data. The calibration of the scanner is a process of adjusting the R, G, and B color values of the RGB image data as the read image data to appropriate values. In a configuration such as that of the above-described image forming apparatus 100 including the scanner 1 and the plotter 9 in the same housing, the calibration is performed with patch images for calibration formed on a print medium by the plotter 9 and read by the scanner 1.

Typically, a scanner outputs RGB image data, while a plotter performs image formation with CMYK image data. When the color combination is thus different between a sensor (i.e., the scanner) and an output device (i.e., the plotter), the R, G, and B values of the RGB image data output from the sensor are converted into device-independent color space components, such as XYZ chromaticity values, for example, which are then converted into CMYK image data represented by C, M, Y, and K values. The above-described patch images are formed by converting the grayscale calculated based on the XYZ chromaticity values into the grayscale of the CMYK image data, for example.

The process of conversion between the XYZ chromaticity values and the R, G, and B values or the C, M, Y, and K values is performed by a variety of methods, such as an approximation method using linear transformation based on a matrix, a method using approximation by polynomial transformation, a method using a neural network, and a method using a lookup table.

Figure 8:
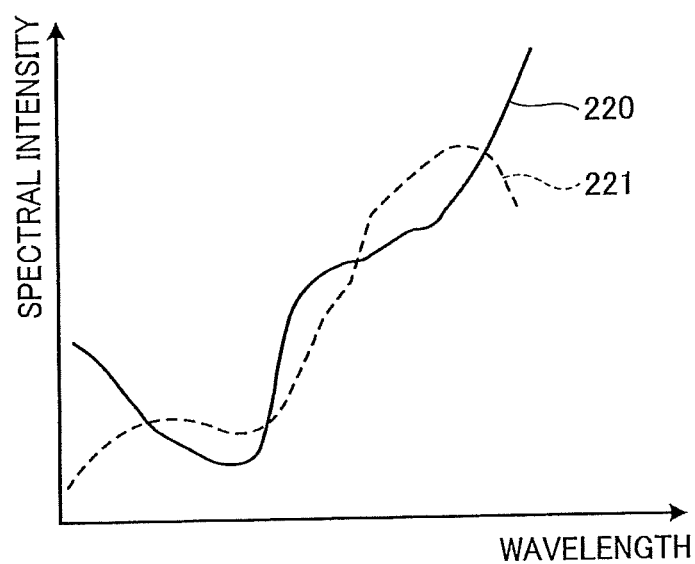
FIG. 8 is a graph schematically illustrating metamerism.

With reference to FIG. 8, metamerism will be schematically described.

In FIG. 8, the horizontal axis represents the wavelength, and the vertical axis represents the spectral intensity. When two colors have different spectral distribution characteristics, as indicated by characteristic lines 220 and 221, the two colors may have the same XYZ chromaticity values (i.e., look like the same color) under a certain observation condition. These two colors are called a metameric pair.

When two colors of a first color and a second color form a metameric pair, if the first color is a tertiary color formed with the C, M, and Y colors and the second color is the black (K) color, a tertiary color formed by a combination of colors including the K color (e.g., CMK, MYK, or CYK), or a quaternary color formed with the C, M, Y, and K colors, the first color and the second color may exhibit different characteristics when the R, G, and B values of the two colors are detected by the scanner, for example, even if the first color and the second color have the same XYZ chromaticity values. It is therefore difficult to perform sufficient approximation with the linear transformation based on a matrix, for example.

Figure 9:
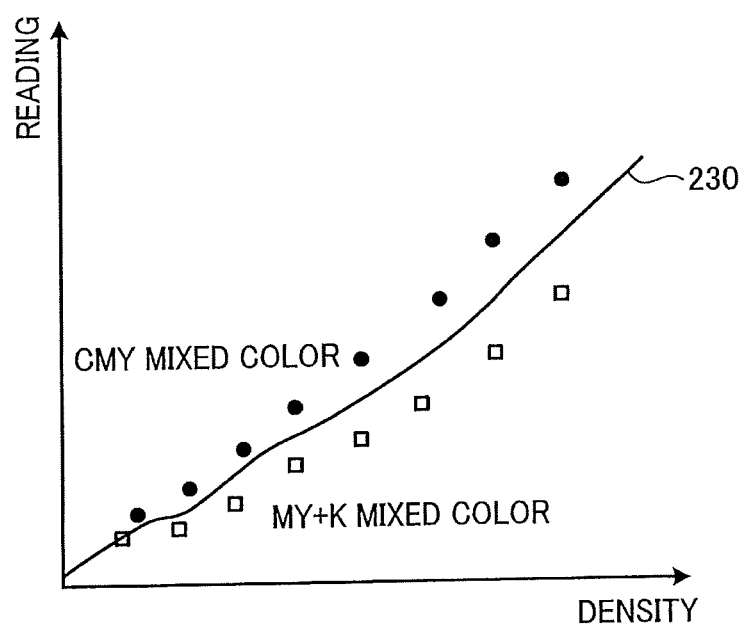
FIG. 9 is a schematic graph illustrating an example of black colors read by a sensor that detects R, G, and B values.

For instance, when the matrix for linear transformation is calculated to fit both the first color and the second color, approximation based on the matrix provides an average characteristic between the characteristic of the first color and the characteristic of the second color. FIG. 9 schematically illustrates an example of black colors read by a sensor that detects the R, G, and B values. In FIG. 9, the horizontal axis represents the density, and the vertical axis represents the reading of the sensor. Further, in FIG. 9, black dots represent an example of the first color, which is a black color formed by a combination of the C, M, and Y colors (i.e., CMY mixed color), and white squares represent an example of the second color, which is a black color formed by a combination of the M, Y, and K colors (i.e., MY+K mixed color) adjusted to have the same XYZ chromaticity values as those of the first color. In this case, approximation based on linear transformation using a matrix determined to fit the first color and the second color is insufficient for both the first color and the second color, as indicated by a characteristic line 230.

As described above, therefore, the scanner 1 of the present embodiment acquires the IR value in addition to the R, G, and B values, and applies predetermined conversion formulae to the R, G, and B values and the IR value to generate the device-independent color space components, such as the XYZ chromaticity values.

Figure 10:
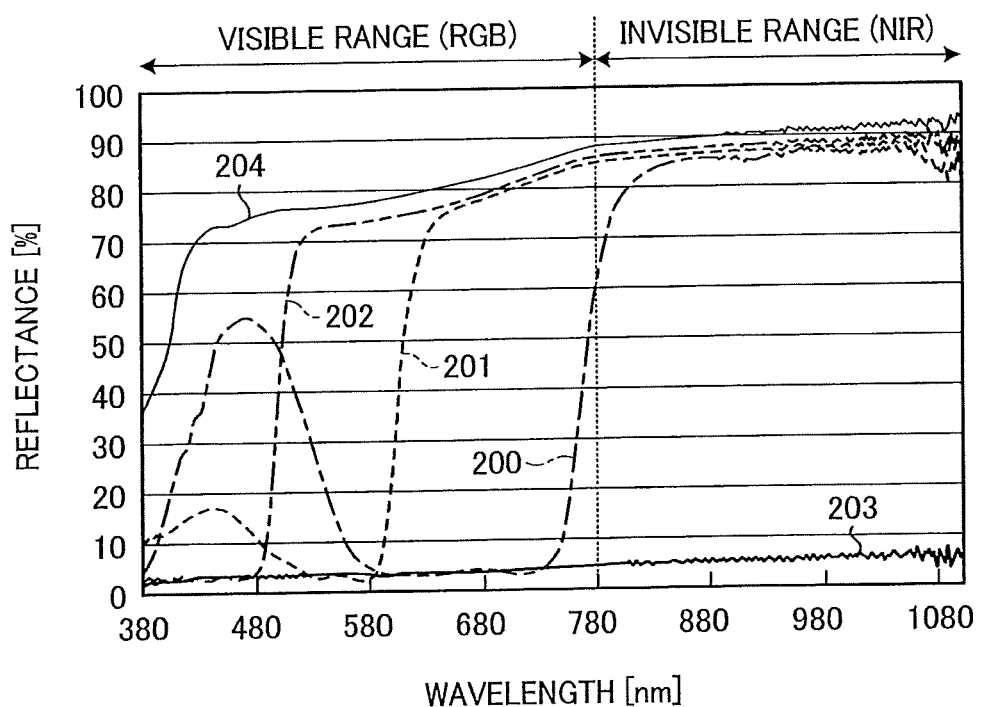
FIG. 10 is a graph illustrating exemplary reflectances of cyan (C), magenta (M), yellow (Y), and black (K) toners, which are used to form a black image on a print medium with the C, M, and Y toners and form a black image on a print medium with the single K toner.

FIG. 10 illustrates exemplary reflectances of the C, M, Y, and K toners used to form, on a print medium, a black image based on the composite gray formed with the C, M, and Y toners and a black image based on the component gray formed with the single K toner. In FIG. 10, the horizontal axis represents the wavelength, and the vertical length represents the reflectance. Similarly as in FIG. 5 described above, it is assumed here that the wavelength range higher than 780 nm and equal to or lower than 1080 nm is the invisible range in which light is not perceivable by human eye, and that the wavelength range higher than 380 nm and equal to or lower than 780 nm is the visible range in which light is perceivable by human eye. Further, in FIG. 10, characteristic lines 200, 201, 202, and 203 represent exemplary reflectances of the C, M, Y, and K toners, respectively, and a characteristic line 204 represents an exemplary reflectance of the print medium.

As for the black color based on the composite gray, the C toner, the M toner, and the Y toner have a reflectance of approximately 5% or lower in a wavelength range from approximately 580 nm to approximately 730 nm, a wavelength range from approximately 520 nm to approximately 580 nm, and a wavelength range from approximately 380 nm to approximately 480 nm, respectively, as indicated by the characteristic lines 200, 201, and 202. These C, M, and Y toners are combined to express a black color in the visible range. In the invisible range (particularly in a range equal to or higher than a wavelength of 800 nm), all of the C, M, and Y toners have a reflectance of 80% or higher.

The K toner, on the other hand, has a reflectance of approximately 5% or lower in the visible range and a reflectance of approximately 8% or lower in the invisible range owing to a light absorbing characteristic thereof.

As described above, there is a clear difference between the black color based on the composite gray and the black color based on the component gray in the invisible range. Therefore, the image formation using the C, M, and Y toners and the image formation using the K toner are accurately controllable based on measurements of reflectances in the invisible range in addition to measurements of reflectances in the visible range.

In the embodiment, for example, patch patterns of the first color and patch patterns of the second color are formed on a print medium by the plotter 9 and read by the scanner 1 to acquire the R, G, B, and IR values of the patch patterns. Herein, the first color is the grayscale black color formed by a combination of the C, M, and Y colors, and the second color is the single K color or a combination of the K color and a color selected from the C, M, and Y colors.

The R, G, B, and IR values read from the patch patterns of the first color and the R, G, B, and IR values read from the patch patterns of the second color are converted into the device-independent color space components. In this process, different conversion formulae are applied to the patch patterns of the first color and the patch patterns of the second color. Thereby, sufficient approximation is performed for each of the first color and the second color, improving the accuracy of color calibration performed on the scanner 1.

Figure 11:
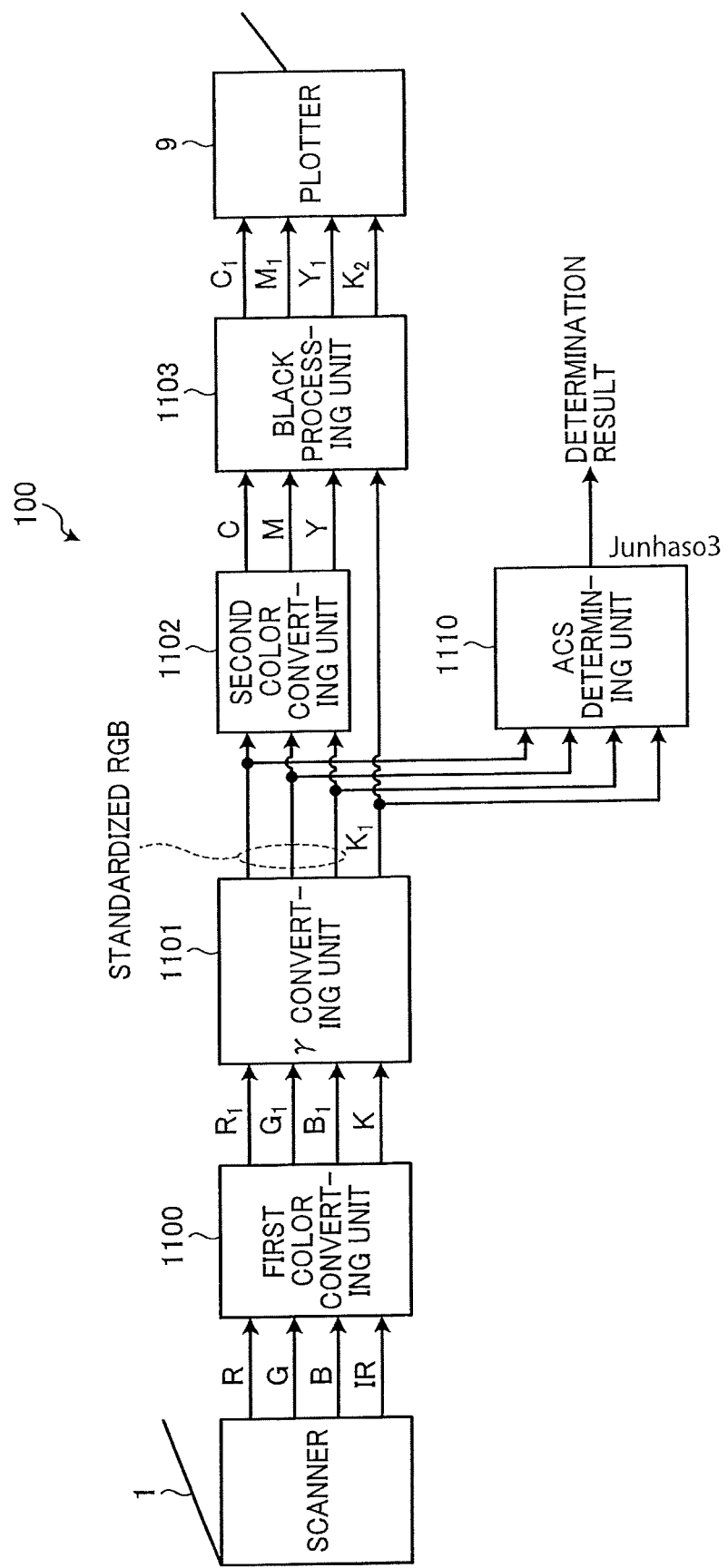
FIG. 11 is an exemplary functional block diagram illustrating a processing procedure of the image forming apparatus according to the embodiment.

FIG. 11 is an exemplary functional block diagram illustrating a processing procedure of the image forming apparatus 100 according to the embodiment. In FIG. 11, the same parts as those in FIG. 1 are assigned with the same reference numerals, and a detailed description thereof will be omitted.

In FIG. 11, the image forming apparatus 100 includes a first color converting unit 1100, a γ converting unit 1101, a second color converting unit 1102, a black processing unit 1103, and an auto color selection (ACS) determining unit 1110. The first color converting unit 1100 and the γ converting unit 1101 are functional units included in, for example, the color converting unit 33 of the first image processing unit 2 in FIG. 1, and the second converting unit 1102 and the black processing unit 1103 are functional units included in, for example, the color converting unit 51 of the second image processing unit 4.

The RGB image data and the IR image data output from the scanner 1 are input to the first color converting unit 1100, which corresponds to the color converting unit 33 described above with reference to FIG. 6. The first color converting unit 1100 converts the input RGB image data and IR image data into $R_1G_1B_1$ image data and black (K) image data, and outputs the $R_1G_1B_1$ image data and the K image data to the γ converting unit 1101. The γ converting unit 1101 outputs the $R_1G_1B_1$ image data and the K image data as the standardized RGB image data and $K_1$ image data.

Figure 12:
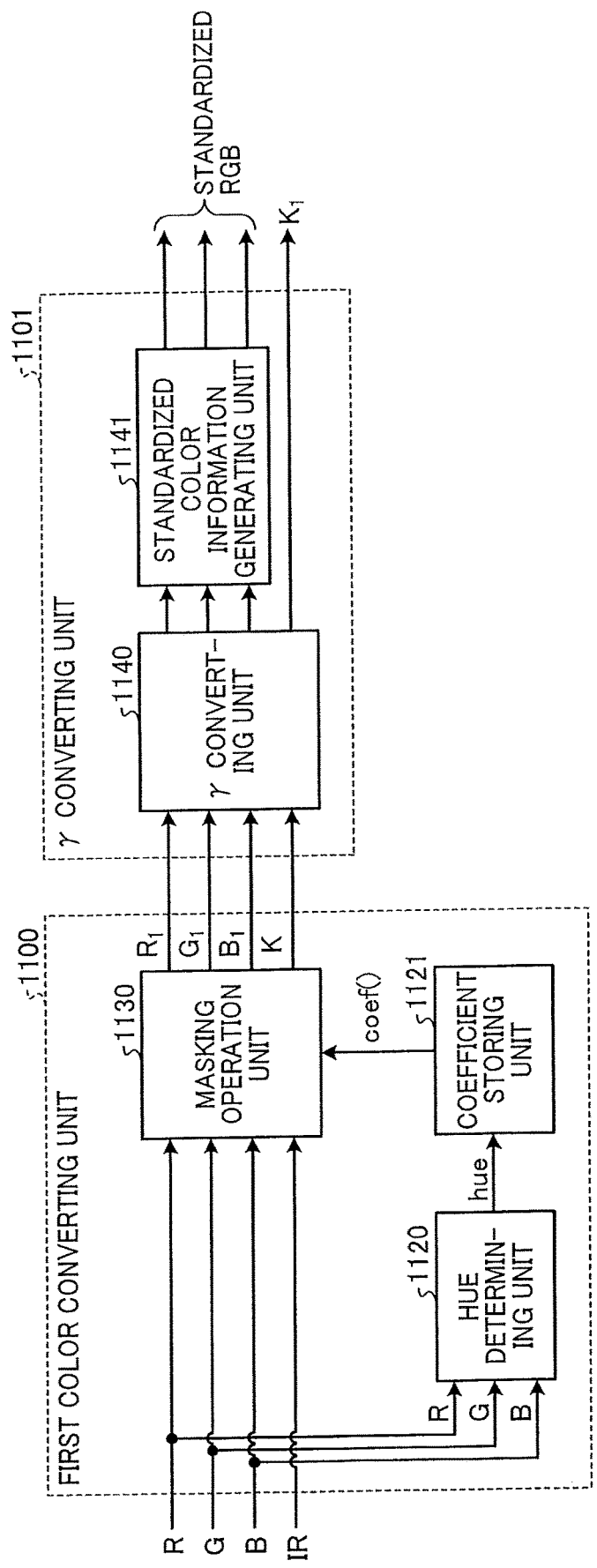
FIG. 12 is a detailed block diagram illustrating an exemplary configuration of a first color converting unit and a γ converting unit of the image forming apparatus according to the embodiment.

FIG. 12 illustrates a more detailed exemplary configuration of the first color converting unit 1100 and the γ converting unit 1101 according to the embodiment. In FIG. 12, the first color converting unit 1100 includes a hue determining unit 1120, a coefficient storing unit 1121, and a masking operation unit 1130. Further, the γ converting unit 1101 includes a γ converting unit 1140 and a standardized color information generating unit 1141.

The RGB image data and the IR image data output from the scanner 1 are input to the first color converting unit 1100 via the scanner correcting unit 30, the γ converting unit 31, and the filtering unit 32. The RGB image data and the IR image data input to the first color converting unit 1100 are supplied to the masking operation unit 1130. In the input RGB image data and IR image data, the RGB image data is supplied to the hue determining unit 1120.

The masking operation unit 1130 performs a masking operation on the supplied RGB image data and IR image data with masking expressions in equations (1) to (4) given below. With this masking operation, the RGB image data and the IR image data supplied to the masking operation unit 1130 are linearly transformed into the $R_1G_1B_1$ image data including R, G, and B components and the K image data based on the RGB image data and the IR image data.

$$R_{out} = \text{coef\_}rr[\text{hue}] \times R_{in} + \text{coef\_}rg[\text{hue}] \times G_{in} + \text{coef\_}rb[\text{hue}] \times B_{in} + \text{coef\_}rk[\text{hue}] \times IR_{in} + \text{const}_R \quad (1)$$

$$G_{out} = \text{coef\_}gr[\text{hue}] \times R_{in} + \text{coef\_}gg[\text{hue}] \times G_{in} + \text{coef\_}gb[\text{hue}] \times B_{in} + \text{coef\_}gk[\text{hue}] \times IR_{in} + \text{const}_G \quad (2)$$

$$B_{out} = \text{coef\_}br[\text{hue}] \times R_{in} + \text{coef\_}bg[\text{hue}] \times G_{in} + \text{coef\_}bb[\text{hue}] \times B_{in} + \text{coef\_}bk[\text{hue}] \times IR_{in} + \text{const}_B \quad (3)$$

$$K_{out} = \text{coef\_}kr[\text{hue}] \times R_{in} + \text{coef\_}kg[\text{hue}] \times G_{in} + \text{coef\_}kb[\text{hue}] \times B_{in} + \text{coef\_}kk[\text{hue}] \times IR_{in} + \text{const}_K \quad (4)$$

In equations (1) to (4), $R_{in}$, $G_{in}$, $B_{in}$, and $IR_{in}$ represent the R component, the G component, the B component, and the IR component, respectively, of the RGB image data and the IR image data output from the scanner 1. Further, $R_{out}$, $G_{out}$, and $B_{out}$ represent the R component, the G component, and the B component calculated with equations (1), (2), and (3), respectively. The R component $R_{out}$, the G component $G_{out}$, and the B component $B_{out}$ are a standard R component, a standard G component, and a standard B component, respectively. For example, the X component, the Y component, and the Z component of the CIE XYZ color space may be applied to the standard R component, the standard G component, and the standard B component, respectively. Further, $K_{out}$ represents the K component calculated with equation (4). For example, the Y component of the CIE XYZ color space may be applied to the K component $K_{out}$.

Masking coefficients coef_rr[hue], coef_rg[hue], coef_rg[hue], and coef_rk[hue] in equation (1), masking coefficients coef_gr[hue], coef_gg[hue], coef_gb[hue], and coef_gk[hue] in equation (2), masking coefficients coef_br[hue], coef_bg[hue], coef_bb[hue], and coef_bk[hue] in equation (3), and masking coefficients coef_kr[hue], coef_kg[hue], coef_kb[hue], and coef_kk[hue] in equation (4) (hereinafter collectively referred to as the masking coefficients coef( )) are specified by respective arguments [hue], read from the coefficient storing unit 1121, and applied to equations (1) to (4).

A method of calculating the masking coefficients coef( ) and a method of determining the arguments [hue] will be described later.

In equations (1) to (4), values $const_R$, $const_G$, $const_B$, and $const_K$ are previously obtained constants. For example, the constants $const_R$, $const_G$, $const_B$, and $const_K$ may be previously obtained by experiments.

The above-described arguments [hue] are determined by the hue determining unit 1120 based on the RGB image data supplied from the scanner 1.

The process of determining the arguments [hue] performed by the hue determining unit 1120 will be described.

In the first color converting unit 1100, the hue determining unit 1120 calculates a hue component of the supplied RGB image data, and determines the arguments [hue] for setting the masking coefficients coef( ) for divided areas corresponding to respective hues. The hue determining unit 1120 divides the hue of the RGB image data by dividing the entirety of a three-dimensional color space excluding the IR component by planes radiating from an achromatic axis (Dr=Dg=Db), as illustrated in FIG. 13.

Figure 13:
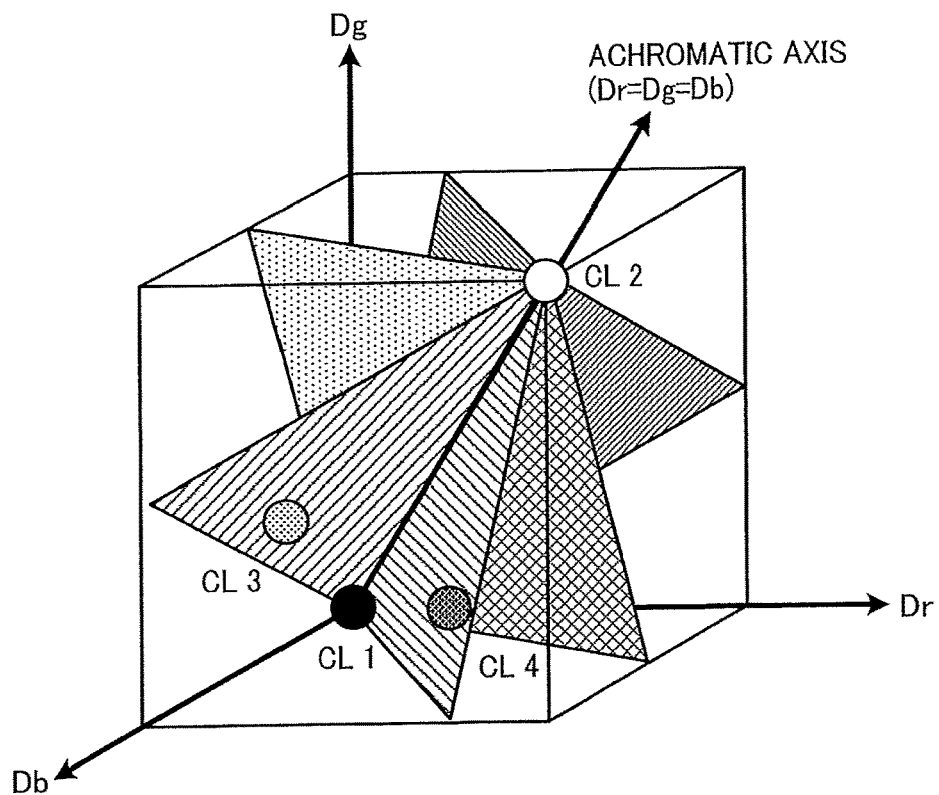
FIG. 13 is a diagram illustrating division of hue of RGB image data applicable to the embodiment.

In FIG. 13, mutually perpendicular axes Dr, Dg, and Db represent the R component, the G component, and the B component, respectively. A point of intersection of the axes Dr, Dg, and Db corresponds to black color CL1, and a point connecting respective normalized maximum values of the R component, the G component, and the B component corresponds to white color CL2. Color CL3 and color CL4 illustrated in FIG. 13 will be described later.

Specifically, the hue determining unit 1120 performs the hue determination by converting the RGB image data into hue data HUE, comparing the hue data HUE with preset hue boundary values $Hue_{00}$, $Hue_{01}$, $Hue_{02}$, $Hue_{03}$, $Hue_{04}$, $Hue_{05}$, $Hue_{06}$, $Hue_{07}$, $Hue_{08}$, $Hue_{09}$, $Hue_{10}$, and $Hue_{11}$, and determining, based on the result of comparison, which one of twelve divided hue areas includes the hue data HUE. Based on the hue area including the hue data HUE, the corresponding argument [hue] is determined.

Figure 14:
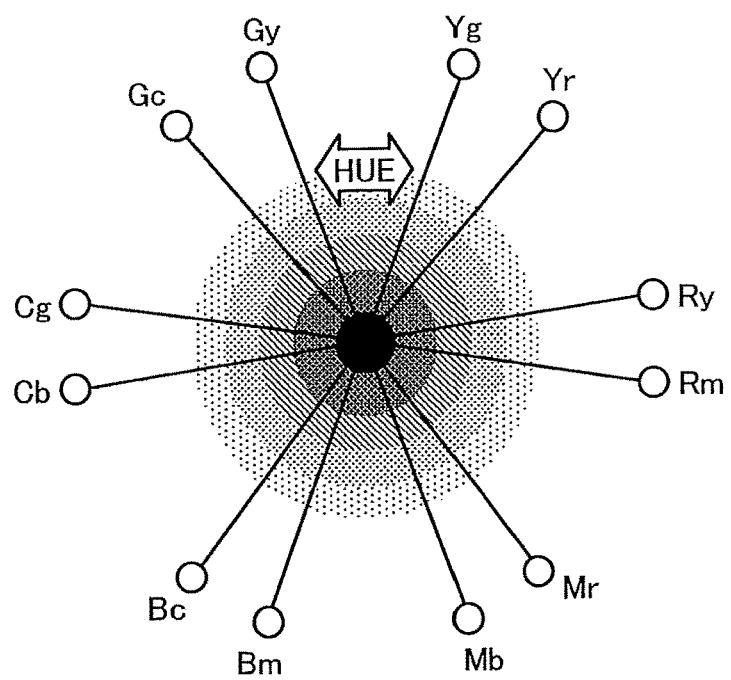
FIG. 14 is a diagram illustrating exemplary hue areas applicable to the embodiment.

FIG. 14 illustrates exemplary hue areas applicable to the embodiment, as viewed from color CL2 toward color CL1, for example, on the achromatic axis of the color space in FIG. 13. As illustrated in FIG. 14, the hue is divided at 12 division points of the color space, i.e., at two division points for each of primary colors C, M, and Y and secondary colors R, G, and B. FIG. 14 illustrates these 12 division points as corresponding to colors Rm, Ry, Yr, Yg, Gy, Gc, Cg, Cb, Bc, Bm, Mb, and Mr. The division points serve as hue boundaries. For example, counterclockwise from the color Rm, the colors Rm, Ry, Yr, Yg, Gy, Gc, Cg, Cb, Bc, Bm, Mb, and Mr correspond to the hue boundary values $Hue_{00}$, $Hue_{01}$, $Hue_{02}$, $Hue_{03}$, $Hue_{04}$, $Hue_{05}$, $Hue_{06}$, $Hue_{07}$, $Hue_{08}$, $Hue_{09}$, $Hue_{10}$, and $Hue_{11}$, respectively.

TABLE 1 given below illustrates an exemplary relationship between the color of each of the hue boundaries $Hue_{00}$ to $Hue_{11}$, scanner vector, and printer vector. The scanner vector represents the color based on the reading of the scanner 1, and the printer vector represents the color corresponding to the output value (i.e., print color) of the plotter 9.

TABLE 1

| chromatic/achromatic | color | scanner vector | printer vector |
|---|---|---|---|
| achromatic | W | (Wr, Wg, Wb) | (Wc, Wm, Wy, Wk) |
| achromatic | K | (Kr, Kg, Kb) | (Kc, Km, Ky, Kk) |
| chromatic | Rm | (Rmr, Rmg, Rmb) | (Rmc, Rmm, Rmy, Rmk) |
| chromatic | Ry | (Ryr, Ryg, Ryb) | (Ryc, Rym, Ryy, Ryk) |
| chromatic | Yr | (Yrr, Yrg, Yrb) | (Yrc, Yrm, Yry, Yrk) |
| chromatic | Yg | (Ygr, Ygg, Ygb) | (Ygc, Ygm, Ygy, Ygk) |
| chromatic | Gy | (Gyr, Gyg, Gyb) | (Gyc, Gym, Gyy, Gyk) |
| chromatic | Gc | (Gcr, Gcg, Gcb) | (Gcc, Gcm, Gcy, Gck) |
| chromatic | Cg | (Cgr, Cgg, Cgb) | (Cgc, Cgm, Cgy, Cgk) |
| chromatic | Cb | (Cbr, Cbg, Cbb) | (Cbc, Cbm, Cby, Cbk) |
| chromatic | Bc | (Bcr, Bcg, Bcb) | (Bcc, Bcm, Bcy, Bck) |
| chromatic | Bm | (Bmr, Bmg, Bmb) | (Bmc, Bmm, Bmy, Bmk) |
| chromatic | Mb | (Mbr, Mbg, Mbb) | (Mbc, Mbm, Mby, Mbk) |
| chromatic | Mr | (Mrr, Mrg, Mrb) | (Mrc, Mrm, Mry, Mrk) |

In TABLE 1, white (W) and black (K) are achromatic colors located on the achromatic axis, while the other colors Rm, Ry, Yr, Yg, Gy, Gc, Cg, Cb, Bc, Bm, Mb, and Mr corresponding to the hue boundaries in FIG. 14 are chromatic. In each of reference signs representing a color, a capital letter represents a main color, and a small letter represents a hue added to the main color and corresponding to one of the C, M, Y, R, G, and B colors, for example. Further, three values in each of scanner vectors are R, G, and B color values (e.g., Rmr, Rmg, and Rmb) for expressing the corresponding main color (e.g., Rm). Similarly, four values in each of printer vectors are C, M, Y, and K color values for forming the corresponding main color.

The hue determination process applicable to the embodiment will be described in more detail.

The hue determining unit 1120 first performs a color difference generation process to calculate color difference data (X, Y) based on the RGB image data. Herein, when the values of the R image data, the G image data, and the B image data in the RGB image data are represented as R, G, and B, respectively, the values X and Y of the color difference data (X, Y) are calculated as X=G−R and Y=B−G.

Figure 15:
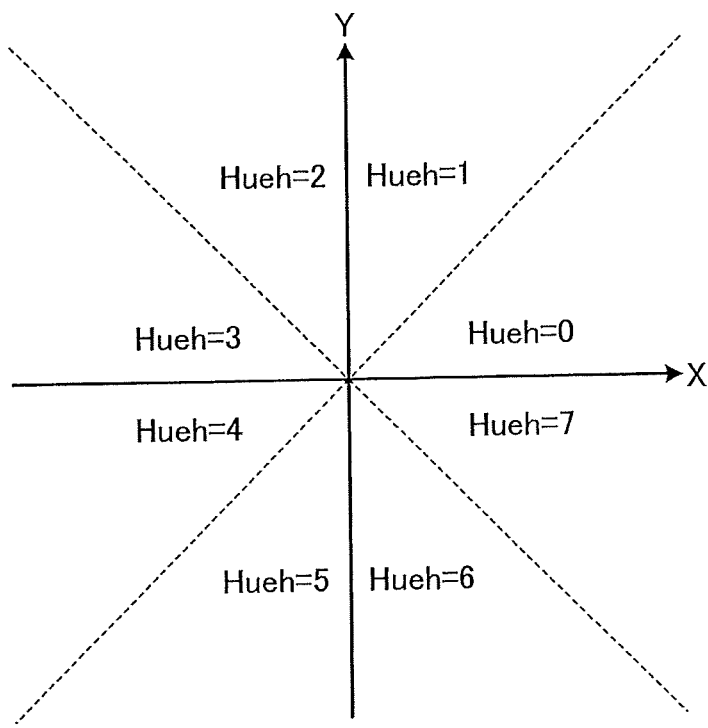
FIG. 15 is a graph illustrating wide area hue information applicable to the embodiment.

The hue determining unit 1120 then performs a wide area hue detection process to generate wide area hue information Hueh from the color difference data (X, Y) calculated by the color difference generation process. As illustrated in FIG. 15, the wide area hue information Hueh represents the respective positions of eight areas obtained by dividing the X-Y plane of the color difference data (X, Y) by eight. In FIG. 15, wide area hue information Hueh=0, Hueh=1, Hueh=2, Hueh=3, Hueh=4, Hueh=5, Hueh=6, and Hueh=7 are sequentially assigned to the eight divided areas counterclockwise from the positive direction of the X axis.

A method of generating the wide area hue information Hueh will be described.

Condition elements $HT_0$, $HT_1$, $HT_2$, $HT_3$, $HT_4$, $HT_5$, $HT_6$, and $HT_7$ are first defined as: $HT_0=(Y\geq 0)$, $HT_1=(Y\geq X)$, $HT_2=(X\leq 0)$, $HT_3=(Y\leq -X)$, $HT_4=(Y\leq 0)$, $HT_5=(Y\leq X)$, $HT_6=(X\geq 0)$, and $HT_7=(Y\geq -X)$.

Based on the condition elements $HT_0$ to $HT_7$, the wide area hue information Hueh is detected with conditional expressions: $!HT_1 \wedge HT_0$:Hueh=0, $!HT_2 \wedge HT_1$:Hueh=1, $!HT_3 \wedge HT_2$:Hueh=2, $!HT_4 \wedge HT_3$:Hueh=3, $!HT_5 \wedge HT_4$:Hueh=4, $!HT_6 \wedge HT_5$:Hueh=5, $!HT_7 \wedge HT_6$:Hueh=6, and $!HT_0 \wedge HT_7$:Hueh=7. In these conditional expressions, a sign "!" represents logical negation of the corresponding element, and a sign ":" indicates that the expression on the right side thereof holds under the condition on the left side thereof. Further, a sign "$\wedge$" represents logical conjunction.

The hue determining unit 1120 then generates color difference information (XA, YA) in accordance with the wide area hue information Hueh. The color difference information (XA, YA) is coordinates obtained by rotating and moving the color difference data (X, Y) to the area assigned with the wide area hue information Hueh=0 in FIG. 15. Herein, the values XA and YA are expressed as XA=X and YA=Y in Hueh=0, XA=X+Y and YA=−X+Y in Hueh=1, XA=Y and YA=−X in Hueh=2, XA=−X+Y and YA=−X−Y in Hueh=3, XA=−X and YA=−Y in Hueh=4, XA=−X−Y and YA=X−Y in Hueh=5, XA=−Y and YA=X in Hueh=6, and XA=X−Y and YA=X+Y in Hueh=7.

Then, the hue determining unit 1120 generates narrow area hue information Huel from the color difference information (XA, YA). The narrow area hue information Huel corresponds to the gradient of the coordinates of the color difference data (X, Y), i.e., Huel/32=YA/XA. The narrow area hue information Huel is expressed as Huel=0x1F when the value XA of the color difference information (XA, YA) is zero. Otherwise, the narrow area hue information Huel is expressed as Huel=(YA<<5)/XA. Herein, "0x" indicates that a letter subsequent thereto represents a hexadecimal value, and "<<" represents a bit left-shift operation.

The hue determining unit 1120 then performs a hue area determination process of comparing each of the 8-bit hue boundary values $Hue_{00}$ to $Hue_{11}$ with the value of hue information Huehl, for example, to generate a hue area Hue based on the result of hue area determination. The hue information Huehl includes the wide area hue information Hueh and the narrow area hue information Huel, and is expressed as Huehl (Hueh, Huel). Based on the hue information Huehl and the hue boundary values $Hue_{00}$ to $Hue_{11}$, the hue area Hue is generated as $Hue_{00}$<Huehl≤$Hue_{01}$: Hue=1, $Hue_{01}$<Huehl≤$Hue_{02}$:Hue=2, $Hue_{02}$<Huehl≤$Hue_{03}$: Hue=3, $Hue_{03}$<Huehl≤$Hue_{04}$:Hue=4, $Hue_{04}$<Huehl≤$Hue_{05}$: Hue=5, $Hue_{05}$<Huehl≤$Hue_{06}$:Hue=6, $Hue_{06}$<Huehl≤$Hue_{07}$: Hue=7, $Hue_{07}$<Huehl≤$Hue_{08}$: Hue=8, $Hue_{08}$<Huehl≤$Hue_{09}$: Hue=9, $Hue_{09}$<Huehl≤$Hue_{10}$:Hue=10, $Hue_{10}$<Huehl ≤$Hue_{11}$:Hue=11, and ($Hue_{11}$<Huehl)/\(Huehl≤$Hue_{00}$): Hue=0.

The thus-calculated values 0 to 11 of the hue area Hue are used as the arguments [hue] that determine the masking coefficients coef( ).

The method of calculating the masking coefficients coef ( ) will be described with reference back to FIG. 13.

The masking coefficient coef( ) for each hue (i.e., each argument [hue]) is determinable based on the relationship of color components at four points before the masking operation and the color components at the four points after the masking operation. Herein, the four points are two points on the achromatic axis (e.g., the points corresponding to colors CL1 and CL2) and two points on two hue boundaries forming the hue area Hue (e.g., the points corresponding to colors CL3 and CL4).

Herein, the R, G, B, and IR components before the masking operation are represented as Dxr, Dxg, Dxb, and Dxir, respectively, and the $R_1$, $G_1$, $B_1$, and K components resulting from the masking operation are represented as $Dxr_1$, $Dxg_1$, $Dxb_1$, and Dxk, respectively. Herein, "x" is "1" representing color CL1, "2" representing color CL2, "3" representing color CL3, or "4" representing color CL4.

The relationships between the pre-masking color components and the post-masking color components at the four points of colors CL1 to CL4 in FIG. 13 is expressed by determinant (5) given below.

[Math. 1]

$$\overset{\text{color } CL1}{\begin{pmatrix} D1r_1 \\ D1g_1 \\ D1b_1 \\ D1k \end{pmatrix}} \leftrightarrow \begin{pmatrix} D1r \\ D1g \\ D1b \\ D1ir \end{pmatrix} \overset{\text{color } CL2}{\begin{pmatrix} D2r_1 \\ D2g_1 \\ D2b_1 \\ D2k \end{pmatrix}} \leftrightarrow \begin{pmatrix} D2r \\ D2g \\ D2b \\ D2ir \end{pmatrix} \quad (5)$$

$$\overset{\text{color } CL3}{\begin{pmatrix} D3r_1 \\ D3g_1 \\ D3b_1 \\ D3k \end{pmatrix}} \leftrightarrow \begin{pmatrix} D3r \\ D3g \\ D3b \\ D3ir \end{pmatrix} \overset{\text{color } CL4}{\begin{pmatrix} D4r_1 \\ D4g_1 \\ D4b_1 \\ D4k \end{pmatrix}} \leftrightarrow \begin{pmatrix} D4r \\ D4g \\ D4b \\ D4ir \end{pmatrix}$$

The left sides and the right sides of determinants representing the relationships between the pre-masking color components and the post-masking color components of colors CL1 to CL4 in determinant (5) are integrated into determinant (6) given below:

[Math. 2]

$$\begin{pmatrix} D1r_1 & D2r_1 & D3r_1 & D4r_1 \\ D1g_1 & D2g_1 & D3g_1 & D4g_1 \\ D1b_1 & D2b_1 & D3b_1 & D4b_1 \\ D1k & D2k & D3k & D4k \end{pmatrix} \leftrightarrow \begin{pmatrix} D1r & D2r & D3r & D4r \\ D1g & D2g & D3g & D4g \\ D1b & D2b & D3b & D4b \\ D1ir & D2ir & D3ir & D4ir \end{pmatrix} \quad (6)$$

With matrix |X| representing the masking coefficient, the left side and the right side of determinant (6) are associated with each other as in determinant (7) given below.

[Math. 3]

$$\begin{pmatrix} D1r_1 & D2r_1 & D3r_1 & D4r_1 \\ D1g_1 & D2g_1 & D3g_1 & D4g_1 \\ D1b_1 & D2b_1 & D3b_1 & D4b_1 \\ D1k & D2k & D3k & D4k \end{pmatrix} = \quad (7)$$

$$\begin{pmatrix} Xrr & Xrg & Xrb & Xrir \\ Xgr & Xgg & Xgb & Xgir \\ Xbr & Xbg & Xbb & Xbir \\ Xkr & Xkg & Xkb & Xkir \end{pmatrix} \begin{pmatrix} D1r & D2r & D3r & D4r \\ D1g & D2g & D3g & D4g \\ D1b & D2b & D3b & D4b \\ D1ir & D2ir & D3ir & D4ir \end{pmatrix}$$

With an inverse matrix of the right side of determinant (7), matrix |X| is obtained as in determinant (8) given below.

[Math. 4]

$$\begin{pmatrix} Xrr & Xrg & Xrb & Xrir \\ Xgr & Xgg & Xgb & Xgir \\ Xbr & Xbg & Xbb & Xbir \\ Xkr & Xkg & Xkb & Xkir \end{pmatrix} = \quad (8)$$

$$\begin{pmatrix} D1r_1 & D2r_1 & D3r_1 & D4r_1 \\ D1g_1 & D2g_1 & D3g_1 & D4g_1 \\ D1b_1 & D2b_1 & D3b_1 & D4b_1 \\ D1k & D2k & D3k & D4k \end{pmatrix} \begin{pmatrix} D1r & D2r & D3r & D4r \\ D1g & D2g & D3g & D4g \\ D1b & D2b & D3b & D4b \\ D1ir & D2ir & D3ir & D4ir \end{pmatrix}^{-1}$$

In thus-obtained matrix |X|, the values in the first row correspond to the masking coefficients coef_rr[hue], coef_rg

[hue], coef_rb[hue], and coef_rk[hue] in equation (1), and the values in the second row correspond to the masking coefficients coef_gr[hue], coef_gg[hue], coef_gb[hue], and coef_gk[hue] in equation (2). Similarly, the values in the third row of matrix |X| correspond to the masking coefficients coef_br[hue], coef_bg[hue], coef_bb[hue], and coef_bk[hue] in equation (3), and the values in the fourth row of matrix |X| correspond to the masking coefficients coef_kr[hue], coef_kg[hue], coef_kb[hue], and coef_kk[hue] in equation (4).

Determinants (5) to (8) described above are calculated for the respective hue areas Hue=0 to Hue=11 to previously generate the masking coefficients coef( ) for the hue areas Hue=0 to Hue=11.

The RGB image data and the IR image data based on colors CL1 to CL4 used in determinant (5) may be acquired based on measurement values of patch patterns formed on a print medium in a predetermined manner and measured by a spectrometer, for example. The masking coefficients coef( ) generated for the respective hue areas Hue=0 to Hue=11 are stored in the coefficient storing unit 1121 in association with the respective arguments [hue] (i.e., arguments [0] to [11]).

The masking operation unit 1130 inputs, to the γ converting unit 1101, the $R_1G_1B_1$ image data and the K image data converted from the input RGB image data and IR image data with equations (1) to (4). In the γ converting unit 1101, the γ converting unit 1140 performs a predetermined γ conversion process on the $R_1G_1B_1$ image data and the K image data. The $K_1$ image data obtained from the γ conversion process performed on the K image data by the γ converting unit 1140 is directly output from the γ converting unit 1101 as the predicted K component.

The $R_1G_1B_1$ image data subjected to the γ conversion process by the γ converting unit 1140 is supplied to the standardized color information generating unit 1141. The standardized color information generating unit 1141 converts the supplied $R_1G_1B_1$ image data into the image data of the device-independent color space components, i.e., the standardized RGB image data, by employing a known conversion method.

The standardized RGB image data may be image data expressed by the tristimulus values of the XYZ color system or conforming to sRGB as an international standard specified by International Electrotechnical Commission (IEC). However, the standardized RGB image data is not limited thereto, and may be image data in the L*a*b* color system or the L*u*v* color system defined by CIE. It is assumed in the present example that the standardized RGB image data is image data in the XYZ color system. The standardized RGB image data is output from the γ converting unit 1101 together with the above-described $K_1$ image data.

Referring back to FIG. 11, in the standardized RGB image data and the $K_1$ image data output from the γ converting unit 1101, the standardized RGB image data is supplied to the second color converting unit 1102, and the $K_1$ image data is supplied to the black processing unit 1103. The second color converting unit 1102 converts the standardized RGB image data into the CMY image data suitable for the plotter 9 by employing a known conversion method such as the memory map interpolation method, for example. The second color converting unit 1102 supplies the CMY image data converted from the standardized RGB image data to the black processing unit 1103.

With masking expressions in equations (9) to (12) given below, the black processing unit 1103 performs the masking operation on the CMY image data supplied form the second color converting unit 1102 and the $K_1$ image data directly supplied from the γ converting unit 1101. With this masking operation, the CMY image data and the $K_1$ image data supplied to the black processing unit 1103 are linearly transformed into the CMYK image data suitable for the image formation of the plotter 9.

$$C_{out}=\text{coef\_cc} \times C_{in}+\text{coef\_cm} \times M_{in}+\text{coef\_cy} \times Y_{in}+\text{coef\_ck} \times K_{in}+\text{const}_C \quad (9)$$

$$M_{out}=\text{coef\_mc} \times C_{in}+\text{coef\_mm} \times M_{in}+\text{coef\_my} \times Y_{in}+\text{coef\_mk} \times K_{in}+\text{const}_M \quad (10)$$

$$Y_{out}=\text{coef\_yc} \times C_{in}+\text{coef\_ym} \times M_{in}+\text{coef\_yy} \times Y_{in}+\text{coef\_yk} \times K_{in}+\text{const}_Y \quad (11)$$

$$K_{out}=\text{coef\_kc} \times C_{in}+\text{coef\_km} \times M_{in}+\text{coef\_ky} \times Y_{in}+\text{coef\_kk} \times K_{in}+\text{const}_{K1} \quad (12)$$

In equations (9) to (12), $C_{in}$, $M_{in}$, and $Y_{in}$ represent the C component, the M component, and the Y component, respectively, of the CMY image data output from the second color converting unit 1102. For example, $C_{in}$, $M_{in}$, and $Y_{in}$ represent predicted components of the C, M, and Y colors used by the plotter 9 to form a full-color image without using the K component.

With equations (9) to (12), the black processing unit 1103 performs the masking operation on the predicted components $C_{in}$, $M_{in}$, and $Y_{in}$ of the C, M, and Y colors and the predicted component $K_{in}$ of the K color in the $K_1$ image data output from the γ converting unit 1101. Thereby, $C_{out}$, $M_{out}$, $Y_{out}$, and $K_{out}$ are calculated as the C component, the M component, the Y component, and the K component to be applied to the plotter 9. In FIG. 11, the C component $C_{out}$, the M component $M_{out}$, the Y component $Y_{out}$, and the K component $K_{out}$ are illustrated as $C_1$, $M_1$, $Y_1$, and $K_2$.

Masking coefficients coef_cc, coef_cm, coef_cy, and coef_ck in equation (9), masking coefficients coef_mc, coef_mm, coef_my, and coef_mk in equation (10), masking coefficients coef_yc, coef_ym, coef_yy, and coef_yk in equation (11), and masking coefficients coef_kc, coef_km, coef_ky, and coef_kk in equation (12) (hereinafter occasionally collectively referred to as the masking coefficients $\text{coef}_1( )$) are previously obtained by calculation, for example, and applied to equations (9) to (12). For example, the masking coefficients $\text{coef}_1( )$ may be calculated based on ideal C, M, Y, and K components and C, M, Y, and K components (i.e., characteristics) of color materials used in the plotter 9.

The standardized RGB image data and the $K_1$ image data output from the γ converting unit 1101 are supplied to the ACS determining unit 1110. Based on the standardized RGB image data and the $K_1$ image data, the ACS determining unit 1110 determines the color of the image of the document read by the scanner 1 to determine whether the image is a color image or a monochrome image, and if the image is a color image, whether the color image is a photograph image. The ACS determining unit 1110 then outputs the result of determination. The result of determination is supplied to the plotter 9, for example.

The calibration process of the scanner 1 according to the embodiment will now be described.

In the calibration process according to the embodiment, the pattern generating unit 52 of the second image processing unit 4 generates the patch patterns, and the plotter 9 forms the images of the patch patterns on a print medium. The scanner 1 reads the patch patterns formed on the print medium such that read image data includes the IR component, and the scanner 1 outputs image data including the IR image data. Then, based on equations (1) to (4) described above, the masking operation is performed on the image data including the IR image data and output from the scanner 1, to thereby acquire the standardized RGB image data and the $K_1$ image data based on the result of the masking operation. The values of the acquired standardized RGB image data and $K_1$ image data are compared with respective preset standard values, for example, and the calibration table stored in the scanner correcting unit 30 of the first image processing unit 2 is corrected based on the result of comparison.

The calibration process is performed with the information of the invisible range based on the IR component in addition to the information of the visible range based on the R, G, and B components. Accordingly, the accuracy of the calibration is improved.

In the embodiment, the pattern generating unit 52 generates grayscale patch patterns. Herein, the pattern generating unit 52 generates composite grayscale patches and component grayscale patches. The composite grayscale patches are patch patterns of the first color expressing gradation of composite gray formed by a combination of the C, M, and Y colors. The component grayscale patches are patch patterns of the second color expressing gradation of component gray formed with the single K color. The component grayscale patches may be generated based on calculation with XYZ chromaticity values based on the spectral reflectance specified by CIE, for example.

The pattern generating unit 52 forms the component grayscale patches and the composite grayscale patches at respective predetermined positions on a single print medium, for example.

The component grayscale patches and the composite grayscale patches generated by the pattern generating unit 52 are output from the second image processing unit 4 via the scaling unit 53, the printer γ correcting unit 54, and the gradation processing unit 55. In this process, the scaling unit 53, the printer γ correcting unit 54, and the gradation processing unit 55 do not perform any process on the component grayscale patches and the composite grayscale patches.

The component grayscale patches and the composite grayscale patches output from the second image processing unit 4 are supplied to the plotter 9 via the bus control unit 3, the CPU 6, and the plotter I/F 8. In accordance with an instruction from the CPU 6, the plotter 9 forms, on the single print medium, the image of the component grayscale patches with the single K color and the image of the composite grayscale patches with the combination of the C, M, and Y colors.

Figure 16:
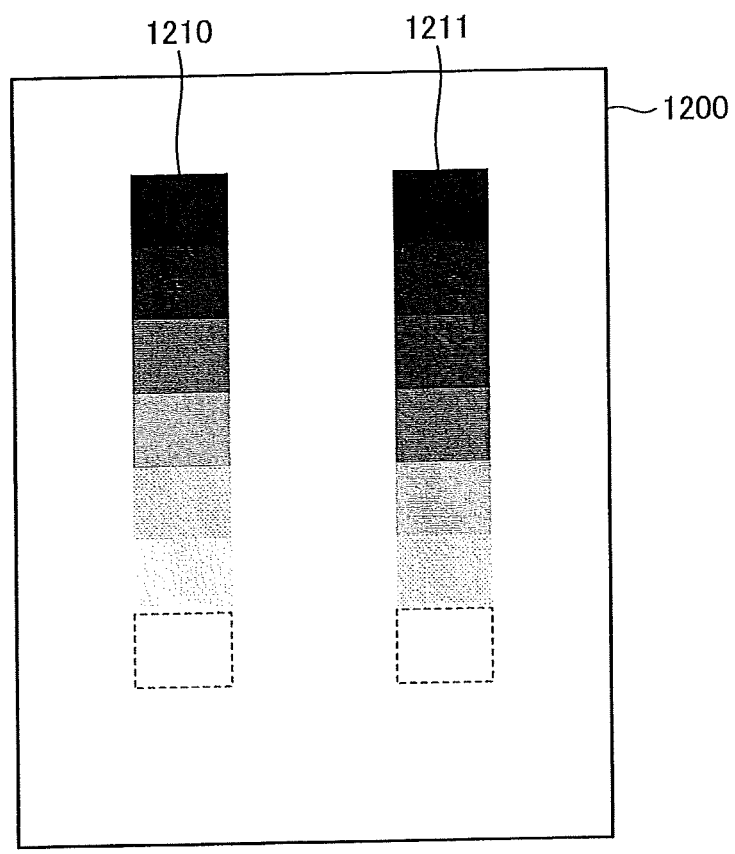
FIG. 16 is a schematic diagram illustrating component grayscale patches and composite grayscale patches formed on a print medium.

FIG. 16 schematically illustrates a first patch image 1210 of component grayscale patches and a second patch image 1211 of composite grayscale patches formed on a print medium 1200. In the example of FIG. 16, the first patch image 1210 and the second patch image 1211 are formed to be increased in density toward the upper side of the print medium 1200. Further, the first patch image 1210 and the second patch image 1211 are formed to have the same density at the same position in the vertical direction of FIG. 16. The first patch image 1210 and the second patch image 1211 in the example of FIG. 16 are illustrated slightly differently from each other to indicate that the image of component grayscale patches and the image of composite grayscale patches look similar in color owing to the metameric relationship therebetween, for example.

In the foregoing description, the first patch image 1210 of component grayscale patches and the second patch image 1211 of composite grayscale patches are formed on a single print medium. However, the formation of the first patch image 1210 and the second patch image 1211 is not limited to this example. For instance, the first patch image 1210 and the second patch image 1211 may be formed on different print media. Further, the shape and arrangement of the first patch image 1210 and the second patch image 1211 are not limited to those of this example.

The print medium 1200 having the first patch image 1210 and the second patch image 1211 thus formed thereon is read by the scanner 1, and the calibration table stored in the scanner correcting unit 30 of the first image processing unit 2 is corrected based on the result of reading, to thereby calibrate the scanner 1.

Figure 17:
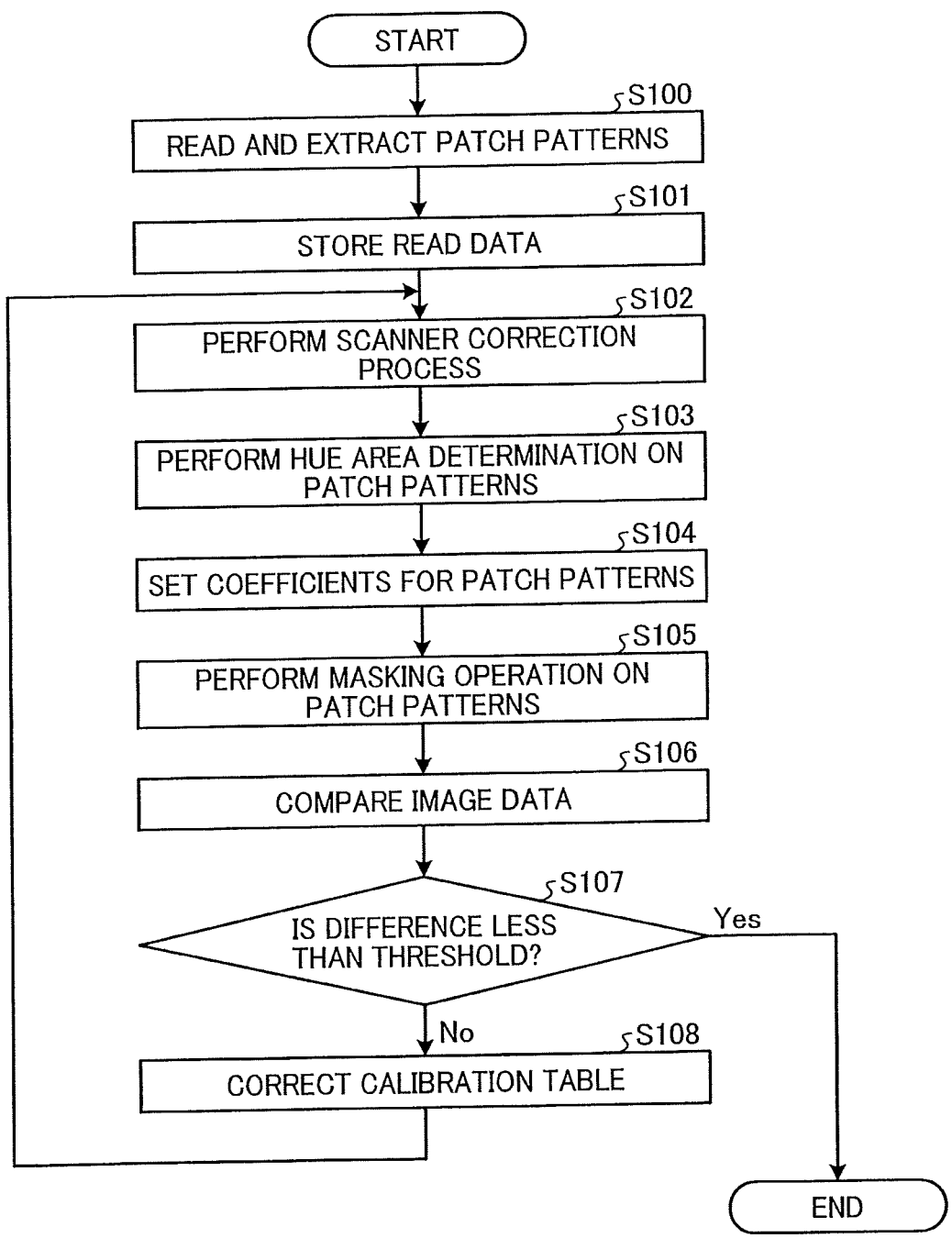
FIG. 17 is a flowchart illustrating an exemplary calibration process according to the embodiment.

FIG. 17 is a flowchart illustrating an exemplary calibration process according to the embodiment. In the image forming apparatus 100, the first image processing unit 2 performs the respective processes of the flowchart in FIG. 17 in accordance with an instruction from the CPU 6.

At step S100 in FIG. 17, in response to an operation performed on the operation display unit 10 by the user, for example, the scanner 1 of the image forming apparatus 100 reads the image of the print medium 1200 having the first patch image 1210 and the second patch image 1211 formed thereon. The CPU 6 extracts the first patch image 1210 and the second patch image 1211 from image data of the read image. At step S101, the extracted read data of the first patch image 1210 and the second patch image 1211 is stored in a buffer memory included in the first image processing unit 2, for example.

At step S102, the scanner correcting unit 30 of the first image processing unit 2 performs a scanner correction process on the read data of the first patch image 1210 and the second patch image 1211 stored at step S101. In this process, the scanner correcting unit 30 adjusts the respective gains of the R, G, B, and IR image data items in the read data based on the data stored in the calibration table.

In the first image processing unit 2, the R, G, B, and IR image data items of the read data subjected to the scanner correction process of the scanner correcting unit 30 are supplied to the color converting unit 33 via the γ converting unit 31 and the filtering unit 32.

At step S103, the color converting unit 33 uses the hue determining unit 1120 to perform the hue area determination process on the first patch image 1210 and the second patch image 1211, i.e., the images of the patch patterns included in the read data supplied by the scanner correcting unit 30, in accordance with the above-described procedure, to thereby acquire the arguments [hue] corresponding to the result of determination. In this process, the color converting unit 33 acquires the arguments [hue] for the first patch image 1210 and the arguments [hue] for the second patch image 1211.

At step S104, the color converting unit 33 uses the hue determining unit 1120 to read the masking coefficients coef( ) from the coefficient storing unit 1121 in accordance with the arguments [hue] acquired at step S103, and sets the read masking coefficients coef( ) in the foregoing masking expressions of equations (1) to (4) used by the masking operation unit 1130.

In this process, the color converting unit 33 prepares the masking expressions of equations (1) to (4) for each of the first patch image 1210 and the second patch image 1211. The color converting unit 33 reads the masking coefficients coef( ) corresponding to the arguments [hue] for the first patch image 1210 from the coefficient storing unit 1121, and applies the masking coefficients coef( ) to the masking expressions corresponding to the first patch image 1210. Similarly, the color converting unit 33 reads the masking coefficients coef( ) corresponding to the arguments [hue] for the second patch image 1211 from the coefficient storing unit 1121, and applies the masking coefficients coef( ) to the masking expressions corresponding to the second patch image 1211.

At step S105, the color converting unit 33 uses the masking operation unit 1130 to perform the masking operation on the RGB image data and the IR image data output from the scanner 1 based on the masking expressions of equations (1) to (4) set with the masking coefficients coef ( ) at step S104, to thereby convert the RGB image data and the IR image data into the $R_1G_1B_1$ image data and the K image data.

In this process, the masking operation unit 1130 performs the masking operation on each of the first patch image 1210 and the second patch image 1211 based on the masking expressions set with the corresponding masking coefficients coef( ). Therefore, the masking operation unit 1130 outputs the $R_1G_1B_1$ image data and the K image data based on the first patch image 1210 and the $R_1G_1B_1$ image data and the K image data based on the second patch image 1211.

The color converting unit 33 uses the γ converting unit 1140, for example, to perform a predetermined γ conversion process on the $R_1G_1B_1$ image data and the K image data based on the first patch image 1210 and the $R_1G_1B_1$ image data and the K image data based on the second patch image 1211, and uses the standardized color information generating unit 1141 to convert the $R_1G_1B_1$ image data based on the first patch image 1210 and the $R_1G_1B_1$ image data based on the second patch image 1211 into the standardized RGB image data.

At step S106, the color converting unit 33 compares the standardized RGB image data converted from the K image data and the $R_1G_1B_1$ image data based on the first patch image 1210 with the standardized RGB image data converted from the K image data and the $R_1G_1B_1$ image data based on the second patch image 1211.

At step S107, the color converting unit 33 determines, as a result of the comparison, whether the difference between the two types of standardized RGB image data is less than a threshold. If the color converting unit 33 determines that the difference therebetween is less than the threshold (Yes at step S107), the sequence of processes of the flowchart in FIG. 17 is completed.

If the color converting unit 33 determines, as a result of the comparison at step S106, that the difference therebetween equals or exceeds the threshold (No at step S107), the color converting unit 33 proceeds to the process of step S108. At step S108, the color converting unit 33 corrects the calibration table included in the scanner correcting unit 30 to reduce the difference. More specifically, the color converting unit 33 corrects the calibration table such that the standardized RGB image corresponding to the second patch image 1211 approaches the standardized RGB image corresponding to the first patch image 1210.

When the correction of the calibration table at step S108 is completed, the color converting unit 33 returns to the process of step S102 to again perform the processes of step S102 and the subsequent steps.

As described above, in the embodiment, the scanner 1 reads the component grayscale patches and the composite grayscale patches such that the read image data includes the IR component. Each of the read image data of the component grayscale patches and the read image data of the composite grayscale patches is converted into the standardized RGB image data and the K image data. Then, the standardized RGB image data and the K image data of the component grayscale patches and the standardized RGB image data and the K image data of the composite grayscale patches are compared with each other. Accordingly, the difference between the composite gray and the component gray having a metameric relationship is clarified. Further, with this difference fed back to the calibration table, the calibration of the scanner 1 is improved in accuracy.

The existing scanner or inline sensor that acquires the read RGB image data is unable to perform image reading in multiple bands. An image forming system employing such a scanner or inline sensor, therefore, has an issue of accuracy particularly in reading or color prediction of a CMYK mixed color pattern formed by a combination of the C, M, Y, and K colors. Further, when the image forming system employing such a scanner or inline sensor (i.e., a reading device) performs automatic color determination on a document printed with the K plate, the image forming system may erroneously determine the document as a color document owing to color shift occurring in the reading device.

The present embodiment enables the read image data of the document read by the scanner or inline sensor to be accurately converted into the CMYK image data.

In the foregoing example, linear transformation based on the masking operation expressed in equations (1) to (4) is performed on the R, G, B, and IR components read from the component grayscale patches and the composite grayscale patches. However, the operation is not limited to this example. The spectral sensitivity of the R, G, B, and IR components output from the scanner 1 and the XYZ chromaticity specified by CIE do not have a perfect linear relationship. As for the composite gray, therefore, it is preferable to use equations with third-order terms of the R, G, B, and IR components output from the scanner 1, in place of the masking operation for linear transformation, to reduce the influence of the imperfect linear relationship.

In this case, the differences are calculated between the XYZ chromaticity values obtained through conversion of the R, G, B, and IR components acquired from the sensor module 1000 and the XYZ chromaticity values based on the spectral reflectance specified by CIE and the predicted K value (i.e., the predicted black component). The two types of XYZ chromaticity values are converted into values in the L*a*b* color system in accordance with the definition set by CIE, and the mean of the differences is calculated as a color difference ΔE.

Matrix |X| in determinant (8) for obtaining the masking coefficients coef( ) for the masking operation is changed depending on the attribute of the patch indicating which one of the component grayscale patch and the composite grayscale patch is the measured patch, such as the type of color material used to form the patch image. The change of matrix |X| depending on the attribute of the patch reduces the color difference ΔE between the XYZ chromaticity values converted from the RGB outputs from the scanner 1 and the XYZ chromaticity values obtained based on the spectral reflectance specified by CIE.

This is because changing matrix |X| depending on the attribute of the patch enables a reduction in the influence of nonlinearity of a color matching function for the spectral sensitivity of the R, G, B, and IR components output from the scanner 1 and the XYZ chromaticity values specified by CIE.

It is therefore understood that the color conversion method according to the embodiment of setting matrix |X| for each attribute of the patch enables a reduction in the color difference between the XYZ chromaticity values converted from the R, G, B, and IR components output from the scanner 1 and the XYZ chromaticity values calculated based on the spectral reflectance specified by CIE.

The calibration method according to the embodiment is based on the assumption that the mixture ratio of the C, M, and Y components in the composite grayscale patch is determinable at the time of detecting the composite grayscale patch. The image forming apparatus 100 equipped with the scanner 1 in FIG. 1 forms each patch at a previously specified position on the print medium, and thus is capable of acquiring the attribute of the patch image read by the scanner 1 and employing the calibration method according to the embodiment.

Further, in the above-described example, the RGB image data and the IR image data output from the scanner 1 are converted into the XYZ chromaticity values and the predicted K value. However, the calibration method according to the embodiment is not limited to this example. That is, the calibration method according to the embodiment is effective when the color matching function for two different color systems is non-linear.

Further, in the above-described example, the attribute of the patch is one of two types, i.e., the component grayscale patch using the single K color and the composite grayscale patch using a combination of the C, M, and Y colors. However, the attribute of the patch is not limited to this example, and a patch formed by another combination of color materials may be used.

Further, in the above-described example, the RGB image data and the K image data output from the scanner 1 are subjected to the linear transformation using a matrix to be converted into the standardized RGB image data expressed by the XYZ chromaticity values, for example. However, the conversion of the image data is not limited to this example. For instance, the conversion of the RGB image data and the K image data output from the scanner 1 into the standardized RGB image data may be performed with polynomial transform, a method using a neural network, or a method using a lookup table.

Any of such methods is capable of reducing the difference between the XYZ chromaticity values converted from the RGB image data and the K image data output from the scanner 1 and the XYZ chromaticity values obtained based on the spectral reflectance specified by CIE, as long as the method is capable of acquiring the attribute of the patch by changing the weight of connection between neurons used in the neural network depending on the attribute of the patch, or by changing the lookup table to be used depending on the attribute of the patch, for example.

In the embodiment, a variety of parameters used in the conversion of the RGB image data and the K image data output from the scanner 1 into the XYZ chromaticity values are changed depending on the attribute of the patch, as described above. Accordingly, the difference between the XYZ chromaticity values converted from the RGB image data and the K image data output from the scanner 1 and the XYZ chromaticity values obtained based on the spectral reflectance specified by CIE is reduced, thereby improving the accuracy of color stabilization control using the XYZ chromaticity values.

A first modified example of the embodiment will now be described.

In the above-described embodiment, the color calibration is performed with the grayscale patch patterns. In the first modified example of the embodiment, the patch patterns used in the color calibration include patch patterns of other colors than gray.

For example, the pattern generating unit 52 of the second image processing unit 4 in FIG. 7 generates patch patterns, and outputs image data of the C, M, Y, and K colors forming the generated patch patterns. Information representing the image data of the C, M, Y, and K colors output from the pattern generating unit 52 is transmitted to the color converting unit 33, for example.

In accordance with the information of the image data of the C, M, Y, and K colors transmitted from the pattern generating unit 52, the color converting unit 33 divides the generated patch patterns into six color categories CC1, CC2, CC3, CC4, CC5, and CC6. The color category CC1 includes primary colors: a single color of C, a single color of M, a single color of Y, and a single color of K. The color category CC2 includes secondary colors: a mixed color of C and M, a mixed color of M and Y, and a mixed color of Y and C. The color category CC3 includes secondary colors: a mixed color of C and K, a mixed color of M and K, and a mixed color of Y and K. The color category CC4 includes a tertiary color: a mixed color of C, M, and Y. The color category CC5 includes tertiary colors: a mixed color of C, M, and K, a mixed color of M, Y, and K, and a mixed color of Y, C, and K. The color category CC6 includes a quartic color: a mixed color of C, M, Y, and K.

Based on equations (1) to (4), the color converting unit 33 further performs the masking operation on the RGB image data and the K image data output from the scanner 1 by changing, for each of the divided color categories CC1 to CC6, the masking coefficients coef( ) based on matrix |X| in determinant equation (8) described above. Thereby, the color converting unit 33 converts the RGB image data and the K image data output from the scanner 1 into the standardized RGB image data.

The quartic color of the color category CC6 may be further divided into color subcategories CSC1, CSC2, CSC3, CSC4, and CSC5 in accordance with the mixture ratio of the C, M, Y, and K colors in the mixed color. The color subcategory CSC1 is expressed as $\text{MIN}(CMY)/K > 1.0$, and the color subcategory CSC2 is expressed as $1.0 \geq \text{MIN}(CMY)/K > 0.75$. The color subcategory CSC3 is expressed as $0.75 \geq \text{MIN}(CMY)/K > 0.5$, and the color subcategory CSC4 is expressed as $0.5 \geq \text{MIN}(CMY)/K > 0.25$. The color subcategory CSC5 is expressed as $\text{MIN}(CMY)/K \geq 0.25$. Herein, MIN( ) represents the minimum one of the color values listed in the parentheses. In this case, the color converting unit 33 performs the masking operation based on matrix |X| by changing the masking coefficients coef( ) for each of the divided color subcategories CSC1 to CSC5.

When the above-described division of color categories according to the CMYK image data is performed on a process color (i.e., a color based on the C, M, Y, and K colors), it is preferable to calculate the mixture ratio at the output level after the γ characteristic correction on the plotter 9.

A second modified example of the embodiment will now be described.

In the above-described embodiment, the image data generating apparatus according to the embodiment is the image forming apparatus 100. However, the image data generating apparatus according to the embodiment is not limited thereto. An image data generating apparatus according to the second modified example of the embodiment includes the scanner 1 and the first image processing unit 2, but does not include the second image processing unit 4 and the plotter 9.

Based on the RGB image data and the IR image data output as the read image data read from the document by the scanner 1, the first image processing unit 2 outputs the standardized RGB image data as the device-independent image data. The standardized RGB image data is usable as information for evaluating the image of the document, for example. Further, for example, if a printer receiving the image data is compatible with the standardized RGB image data, and if the characteristics of color materials used by the printer in image formation are known, the printer is capable of accurately reproducing the image of the document read by the image data generating apparatus according to the second modified example of the embodiment.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image data generating method of generating an image from a document, the image data generating method comprising:
　acquiring, from light reflected by the document, a first image signal corresponding to a plurality of components in a plurality of visible wavelength ranges, a component, acquired from the light reflected by the document, having a reflection absorption characteristic in an invisible wavelength range;
　converting the first image signal into a second image signal including a plurality of device-independent color space components and a black component; and
　generating image data based on the second image signal.

2. The image data generating method of claim 1, wherein the plurality of visible wavelength ranges include a wavelength range of red light, a wavelength range of green light, and a wavelength range of blue light, and
　wherein the invisible wavelength range includes a wavelength range of infrared light.

3. The image data generating method of claim 1, wherein the generating includes
　converting the plurality of device-independent color space components included in the second image signal into a plurality of color components to be included in output image data for an output device; and
　generating the output image data for the output device based on the plurality of color components to be included in the output image data and the black component included in the second image signal.

4. The image data generating method of claim 1, wherein the converting the first image signal includes converting the first image signal into the plurality of device-independent color space components for each of a plurality of hues determined based on a ratio of a plurality of color components in the plurality of visible wavelength ranges.

5. The image data generating method of claim 1, further comprising:
　generating correction information based on the first image signal corresponding to a first patch image and the second image signal corresponding to a second patch image, the first patch image expressing gradation of component gray generated with the black component, and the second patch image expressing gradation of composite gray generated by a combination of a plurality of color components in the plurality of visible wavelength ranges; and
　correcting the first image signal based on the correction information.

6. The image data generating method of claim 5, wherein the correcting includes correcting the correction information to adjust the second image signal corresponding to the second patch image toward the first image signal corresponding to the first patch image.

7. The image data generating method of claim 6, wherein the converting the first image signal includes changing, in accordance with an attribute of a patch read from the document to acquire the first image signal, a coefficient used to convert the first image signal.

8. The image data generating method of claim 7, wherein the attribute includes type of a color material used to form the patch on the document.

9. The image data generating method of claim 1, further comprising:
　scaling each image data item in the first image signal to a predetermined resolution used for all data items prior to converting the first image signal into the second image signal.

10. The image data generating method of claim 1, further comprising:
　sequentially activating a visible light source and an invisible light source to acquire the first image signal.

11. The image data generating method of claim 10, wherein the visible light source and the invisible light source are sequentially activated in synchronicity with an analog-to-digital (A/D) converter that performs analog-to-digital conversion on sensor signals resulting from the plurality of visible wavelength ranges, which are emitted by the visible light source, and performs analog-to-digital conversion on sensor signals resulting from an invisible wavelength range, which is generated by the invisible light source, to generate the first image signal.

12. An image data generating apparatus comprising circuitry to
　acquire, from light reflected by a document, a first image signal corresponding to a plurality of components in a plurality of visible wavelength ranges and a component, acquired from the light reflected by the document, having a reflection absorption characteristic in an invisible wavelength range,
　convert the first image signal into a second image signal including a plurality of device-independent color space components and a black component; and
　generate image data based on the second image signal.

13. An image forming system comprising:
　a reader to
　　receive light beams reflected by a document in a plurality of visible wavelength ranges and receive a light beam reflected by the document in an invisible wavelength range, and
　　output a first image signal including a plurality of signals generated through photoelectric conversion on the received light beams in the plurality of visible wavelength ranges and a signal generated through photoelectric conversion on the received light beam in the invisible wavelength range;
　an image forming unit to form an image with a combination of a plurality of colors; and
　circuitry to
　　acquire the first image signal,
　　convert the first image signal into a second image signal including a plurality of device-independent color space components and a black component, convert the plurality of device-independent color space components included in the second image signal into a plurality of color components to be included in image data for the image forming unit; and generate the image data for the image forming unit based on the plurality of color components to be included in the image data and the black component included in the second image signal.

* * * * *